(12) United States Patent
Ibrahim

(10) Patent No.: US 7,483,533 B2
(45) Date of Patent: *Jan. 27, 2009

(54) ELLIPTIC POLYNOMIAL CRYPTOGRAPHY WITH MULTI X-COORDINATES EMBEDDING

(75) Inventor: Mohammad K. Ibrahim, Dhahran (SA)

(73) Assignee: King Fahd University of Petroleum, Dhahran (SA)

( * ) Notice: Subject to any disclaimer, the term of this patent is extended or adjusted under 35 U.S.C. 154(b) by 610 days.

This patent is subject to a terminal disclaimer.

(21) Appl. No.: 10/911,701

(22) Filed: Aug. 5, 2004

(65) Prior Publication Data
US 2006/0029220 A1 Feb. 9, 2006

(51) Int. Cl.
*H04L 9/00* (2006.01)

(52) U.S. Cl. .............................. 380/44; 380/28; 380/30; 713/171; 713/180

(58) Field of Classification Search .................. 380/44, 380/28
See application file for complete search history.

(56) References Cited

U.S. PATENT DOCUMENTS

| | | | | |
|---|---|---|---|---|
| 5,272,755 A | * | 12/1993 | Miyaji et al. | 380/30 |
| 5,497,423 A | * | 3/1996 | Miyaji | 380/30 |
| 5,627,893 A | | 5/1997 | Demytko | |
| 6,141,420 A | * | 10/2000 | Vanstone et al. | 380/30 |
| 6,307,935 B1 | | 10/2001 | Crandall et al. | |
| 6,898,284 B2 | * | 5/2005 | Solinas | 380/28 |
| 7,079,650 B1 | * | 7/2006 | Knudsen | 380/30 |
| 7,177,422 B2 | * | 2/2007 | Akishita | 380/28 |
| 7,218,735 B2 | * | 5/2007 | Coron et al. | 380/30 |

| | | | |
|---|---|---|---|
| 2001/0048741 A1 | 12/2001 | Okeya | |
| 2003/0059042 A1 | 3/2003 | Okeya et al. | |

OTHER PUBLICATIONS

Koblitz et al, "The State of Elliptic Curve Cryptography", Designs, Codes and Cryptography, 19, pp. 173-193 (2000).
Kocher et al, "Differential Power Analysis", Cryptography Research Inc., San Francisco, CA, pp. 1-10 (1999).
Coron, "Resistance Against Differential Power Analysis for Elliptic Curve Cryptosystems" Published in C.K. Koc and C. Paar, Eds., Cryptographic Hardware and Embedded Systems, vol. 1717 of Lecture Notes in Computer Science, pp. 292-302, Springer-Verlag 1999.

* cited by examiner

*Primary Examiner*—Nasser G Moazzami
*Assistant Examiner*—Michael S McNally
(74) *Attorney, Agent, or Firm*—Lowe Hauptman Ham & Berner, LLP

(57) ABSTRACT

Given a set of elliptic points that satisfy an elliptic polynomial equation defined over a finite field F which requires N-bits to represent its elements, a method of cryptographic encryption and decryption is presented which uses more than one cubic variable that are termed x-coordinates to obtain an elliptic polynomial equation with multi x-coordinates instead of one x-coordinate. The additional nx x-coordinates are used to embed extra message data bits. A nx-fold increase in the number of embedded message data bits in a single elliptic point can be achieved with the improved method. The reason is that the number of points that satisfy an elliptic polynomial equation defined over F and which can be used in the corresponding cryptosystem is increased by a factor of $(\#F)^{nx}$, where # denotes the size of a field. The use of additional x-coordinates can be used to reduce computational complexity. Alternatively, this can be used to increase security by making the bit positions where data bits are embedded known only to the sender and receiver. Also, it can be used as a countermeasure by randomizing the bit positions where data bits are embedded.

29 Claims, 5 Drawing Sheets

ELLIPTIC POLYNOMIAL CRYPTOGRAPHY WITH MULTI X-COORDINATES EMBEDDING

FIELD OF THE INVENTION

This invention relates to a method for Elliptic Polynomial Cryptography with multi x-coordinates embedding and more particularly to a method for encrypting and decrypting a message bit string using a set of points defined over an extended dimensional space that incorporates more than one cubic variable that are termed x-coordinates, and wherein the addition of any two of these points is defined over the extended dimensional space, and wherein this addition is computed using arithmetic over a finite field F.

BACKGROUND FOR THE INVENTION

Cryptography provides methods of providing privacy and authenticity for remote communications and data storage. Privacy is achieved by encryption of data, usually using the techniques of symmetric cryptography (so called because the same mathematical key is used to encrypt and decrypt the data). Authenticity is achieved by the functions of user identification, data integrity, and message non-repudiation. These are best achieved via asymmetric (or public-key) cryptography.

In particular, public-key cryptography enables encrypted communication between users that have not previously established a shared secret key between them. This is most often done using a combination of symmetric and asymmetric cryptography: public-key techniques are used to establish user identity and a common symmetric key, and a symmetric encryption algorithm is used for the encryption and decryption of the actual messages. The former operation is called key agreement. Prior establishment is necessary in symmetric cryptography, which uses algorithms for which the same key is used to encrypt and decrypt a message. Public-key cryptography, in contrast, is based on key pairs. A key pair consists of a private key and a public key. As the names imply, the private key is kept private by its owner, while the public key is made public (and typically associated to its owner in an authenticated manner). In asymmetric encryption, the encryption step is performed using the public key, and decryption using the private key. Thus the encrypted message can be sent along an insecure channel with the assurance that only the intended recipient can decrypt it.

The key agreement can be interactive (e.g., for encrypting a telephone conversation) or non-interactive (e.g., for electronic mail).

User identification is most easily achieved using what are called identification protocols. A related technique, that of digital signatures, provides data integrity and message non-repudiation in addition to user identification.

The public key is used for encryption or signature verification of a given message, and the private key is used for decryption or signature generation of the given message.

The use of cryptographic key pairs was disclosed in U.S. Pat. No. 4,200,770, entitled "CRYPTOGRAPHIC APPARATUS AND METHOD." Also disclosed is the application of key pairs to the problem of key agreement over an insecure communication channel. The algorithms specified in the patent rely for their security on the difficulty of the mathematical problem of finding a discrete logarithm. U.S. Pat. No. 4,200,770 is incorporated herein in its entirety by reference.

In order to undermine the security of a discrete-logarithm based crypto algorithm, an adversary must be able to perform the inverse of modular exponentiation (i.e., a discrete logarithm). There are mathematical methods for finding a discrete logarithm (e.g., the Number Field Sieve), but these algorithms cannot be done in any reasonable time using sophisticated computers if certain conditions are met in the specification of the crypto algorithm.

In particular, it is necessary that the numbers involved be large enough. The larger the numbers used, the more time and computing power is required to find the discrete logarithm and break the cryptograph. On the other hand, very large numbers lead to very long public keys and transmissions of cryptographic data. The use of very large numbers also requires large amounts of time and computational power in order to perform the crypto algorithm. Thus, cryptographers are always looking for ways to minimize the size of the numbers involved, and the time and power required, in performing the encryption and/or authentication algorithms. The payoff for finding such a method is that cryptography can be done faster, cheaper, and in devices that do not have large amounts of computational power (e.g., hand-held smartcards).

A discrete-logarithm based crypto algorithm can be performed in any mathematical setting in which certain algebraic rules hold true. In mathematical language, the setting must be a finite cyclic group. The choice of the group is critical in a cryptographic system. The discrete logarithm problem may be more difficult in one group than in another for which the numbers are of comparable size. The more difficult the discrete logarithm problem, the smaller the numbers that are required to implement the crypto algorithm. Working with smaller numbers is easier and faster than working with larger numbers. Using small numbers allows the cryptographic system to be higher performing (i.e., faster) and requires less storage. So, by choosing the right kind of group, a user may be able to work with smaller numbers, make a faster cryptographic system, and get the same, or better, cryptographic strength than from another cryptographic system that uses larger numbers.

1.1 Elliptic Curves & Cryptography

The groups referred to above come from a setting called finite fields. Methods of adapting discrete-logarithm based algorithms to the setting of elliptic curves are known. However, finding discrete logarithms in this kind of group is particularly difficult. Thus elliptic curve-based crypto algorithms can be implemented using much smaller numbers than in a finite-field setting of comparable cryptographic strength. Thus the use of elliptic curve cryptography is an improvement over finite-field based public-key cryptography.

In practice, an Elliptic Curve group over a finite field F is formed by choosing a pair of a and b coefficients, which are elements within F. The group consists of a finite set of points P(x,y) which satisfy the elliptic curve equation $$F(x,y)=y^2-x^3-ax-b=0 \qquad 1.1$$

together with a point at infinity, O. It is worth noting that an elliptic curve equation contains one cubic variable termed the x-coordinate and one quadratic variable termed the y-coordinate. The coordinates of the point, x and y, are elements of F represented in N-bit strings. In what follows, a point is either written as a capital letter, e.g. P, or as a pair in terms of the affine coordinates, i.e. (x,y).

The Elliptic Curve Cryptosystem relies upon the difficulty of the Elliptic Curve Discrete Logarithm Problem (ECDLP) to provide its effectiveness as a cryptosystem. Using multiplicative notation, the problem can be described as: given points B and Q in the group, find a number k such that $B^k = Q$; where k is called the discrete logarithm of Q to the base B. Using additive notation, the problem becomes: given two points B and Q in the group, find a number k such that kB=Q.

In an Elliptic Curve Cryptosystem, the large integer k is kept private and is often referred to as the secret key. The point Q together with the base point B are made public and are referred to as the public key. The security of the system, thus, relies upon the difficulty of deriving the secret k, knowing the public points B and Q. The main factor that determines the security strength of such a system is the size of its underlying finite field. In a real cryptographic application, the underlying field is made so large that it is computationally infeasible to determine k in a straightforward way by computing all the multiples of B until Q is found.

The core of the elliptic curve geometric arithmetic is an operation called scalar multiplication which computes kB by adding together k copies of the point B. The scalar multiplication is performed through a combination of point-doubling and point-addition operations. The point-addition operation adds two distinct points together and the point-doubling operation adds two copies of a point together. To compute, for example, 11 B=(2*(2*(2B)))+2B=Q, it would take 3 point-doublings and 2 point-additions.

Addition of two points on an elliptic curve is calculated as follows. When a straight line is drawn through the two points, the straight line intersects the elliptic curve at a third point. The point symmetric to this third intersecting point with respect to the x-axis is defined as a point resulting from the addition.

Doubling a point on an elliptic curve is calculated as follows. When a tangent line is drawn at a point on an elliptic curve, the tangent line intersects the elliptic curve at another point. The point symmetric to this intersecting point with respect to the x-axis is defined as a point resulting from the doubling.

Table 1 illustrates the addition rules for adding two points $(x_1, y_1)$ and $(x_2, y_2)$, that is, $$(x_3, y_3) = (x_1, y_1) + (x_2, y_2) \quad\quad 1.2$$

TABLE 1

| Summary of Addition Rules: $(x_3, y_3) = (x_1, y_1) + (x_2, y_2)$ | |
|---|---|
| General Equations | $x_3 = m^2 - x_2 - x_1$ <br> $y_3 = m(x_3 - x_1) + y_1$ |
| Point Addition | $m = \dfrac{y_2 - y_1}{x_2 - x_1}$ |
| Point Doubling $(x_3, y_3) = 2(x_1, y_1)$ | $m = \dfrac{3x_1^2 - \alpha}{2y_1}$ |
| $(x_2, y_2) = -(x_1, y_1)$ <br> $(x_2, y_2) = O$ <br> $-(x_1, y_1)$ | $(x_3, y_3) = (x_1, y_1) + (-(x_2, y_2)) = O$ <br> $(x_3, y_3) = (x_1, y_1) + O = (x_1, y_1)$ <br> $= (x_1, -y_1)$ |

1.2 Overview of Elliptic Curve Encryption and Decryption

Given a message point $(x_m, y_m)$, a base point $(x_B, y_B)$, and a given key, k, the cipher point $(x_C, y_C)$ is obtained using the following equation, $$(x_C, y_C) = (x_m, y_m) + k(x_B, y_B) \quad\quad 1.3$$

There are two basics steps in the computation of the above equations. The first is to find the scalar multiplication of the base point with the key, "$k(x_B, y_B)$". The resulting point is then added to the message point, $(x_m, y_m)$ to obtain the cipher point.

At the receiver, the message point is recovered from the cipher point which is usually transmitted, the shared key and the base point, that is $$(x_m, y_m) = (x_C, y_C) - k(x_B, y_B) \quad\quad 1.4$$

1.3 Embedding Message Data on Elliptic Curve Points

As indicated earlier, the x-coordinate, $x_m$, is represented as an N-bit string. Not all of the N-bits are used to carry information about the data of the secret message.

Assuming that the number of bits of the x-coordinate, $x_m$, that do not carry data is L. The extra bits, L, are used to ensure that message data when embedded into the x-coordinate will lead to an $x_m$ value that satisfies the elliptic curve equation, equation 1.1. Usually, if the first guess of $x_m$ is not on a curve, then the second or third try is. This was first proposed in "N. Kobltiz, Introduction to Elliptic Curve and Modular Forms, New York: Springer-Verlag 1993".

Therefore the number of bits used to carry the bits of the message data is (N−L). Assuming that the secret data is a K-bit string. The number of elliptic curve points needed to encrypt the K-bit data is $$\left\lceil \frac{K}{N-L} \right\rceil.$$

It is important to note that the y-coordinate, $\cdot y_m$, of the message point carries no data bits.

1.4 Attacks

The difficulty in solving the elliptic curve discrete logarithm problem has been established theoretically while information associated with secret information such as the private key or the like may leak out in cryptographic processing in real mounting. Thus, there has been proposed an attack method of so-called power analysis in which the secret information is decrypted on the basis of the leak information.

An attack method in which change in voltage is measured in cryptographic processing using secret information such as DES (Data Encryption Standard) or the like, so that the process of the cryptographic processing is obtained and the secret information is inferred on the basis of the obtained process is disclosed in P. Kocher, J. Jaffe and B. Jun Differential Power Analysis, Advances in Cryptology: Proceedings of CRYPTO '99, LNCS 1666, Springer-Verlag, (1999) pp. 388-397. This attack method is called DPA (Differential Power Analysis).

An elliptic curve cryptosystem to which the above-mentioned attack method is applied is disclosed in J. Coron, Resistance against Differential Power Analysis for Elliptic Curve Cryptosystems, Cryptographic Hardware and Embedded Systems: Proceedings of CHES '99, LNCS 1717, Springer-Verlag, (1999) pp. 292-302. In the elliptic curve cryptosystem, encryption, decryption, signature generation and signature verification of a given message have to be carried out with elliptic curve operations. Particularly, calculation of scalar multiplication on an elliptic curve is used in cryptographic processing using a scalar value as secret information.

As one of the measures against DPA attack on elliptic curve cryptosystems, a method using randomized projective coordinates is known. This is a measure against an attack method of observing whether a specific value appears or not in scalar multiplication calculation, and inferring a scalar value from the observing result. That is, by multiplication with a random value, the appearance of such a specific value is prevented from being inferred.

In the above-mentioned background-art elliptic curve cryptosystem, attack by power analysis such as DPA or the like was not taken into consideration. Therefore, to relieve the attack by power analysis, extra calculation, or the like, other than necessary calculation had to be carried out using secret information to weaken the dependence of the process of the cryptographic processing and the secret information on each other. Thus, time required for the cryptographic processing increased so that cryptographic processing efficiency was lowered particularly in a computer such as an IC card, or the like, which was slow in calculation speed, a server managing an enormous number of cryptographic processes, or the like. In addition, the dependence of cryptographic processing process and secret information on each other cannot be cut off perfectly. In addition, if priority was given to the cryptographic processing efficiency, the cryptosystem was apt to come under attack by power analysis so that there was a possibility that secret information would leak out.

1.5 Speed of Computations

With the development of information communication networks, cryptographic techniques have been indispensable elements for concealment or authentication about electronic information. Speeding up is demanded along with the security of the cryptographic techniques. The elliptic curve discrete logarithm problem is so difficult that elliptic curve cryptosystems can make key length shorter than that in RSA (Rivest-Shamir-Adleman) cryptosystems basing their security on the difficulty of factorization into prime factors. Thus, the elliptic curve cryptosystems open the way to comparatively high-speed cryptographic processing. However, the processing speed is not always high enough to satisfy smart cards which have restricted throughput or servers which have to carry out large volumes of cryptographic processing. It is therefore demanded to further speed up the processing in cryptosystems.

The two equations for m in Table 1 are called slope equations. Computation of a slope equation in finite fields requires one finite field division. Alternatively, the slope computation can be computed using one finite field inversion and one finite field multiplication. Finite field division and finite field inversion are expensive computationally because they require extensive CPU cycles for the manipulation of two elements of a finite field with a large order. Today, it is commonly accepted that a point-doubling and point-addition operation each requires one inversion, two multiplies, a square, and several additions. To date there are techniques to compute finite field division and finite field inversion, and techniques to trade expensive inversions for multiplications by performing the operations in projective coordinates.

In cases where field inversions are significantly more expensive than multiplication, it is efficient to implement projective coordinates. An elliptic curve projective point (X,Y,Z) in conventional projective (or homogeneous) coordinates satisfies the homogeneous Weierstrass equation, $$\tilde{F}(X,Y,Z) = Y^2Z - X^3 - aXZ^2 - bZ^3 = 0 \quad 1.5$$

and, when $z \neq 0$, it corresponds to the affine point $$(x, y) = \left(\frac{X}{Z}, \frac{Y}{Z}\right).$$

It turns out that other projective representations lead to more efficient implementations of the group operation. In particular, the Jacobian representations where the triplets (X,Y,Z) corresponds to the affine coordinates $$(x, y) = \left(\frac{X}{Z^2}, \frac{Y}{Z^3}\right)$$

whenever $z \neq 0$. This is equivalent to using Jacobian elliptic curve equation that is of the form, $$\tilde{F}_J(X,Y,Z) = Y^2 - X^3 - aXZ^4 - bZ^6 = 0 \quad 1.6$$

Another commonly used projection is the Chudnovsky-Jacobian coordinates.

In general terms, the relationship between the affine coordinates and the projection coordinates can be written as $$(x, y) = \left(\frac{X}{Z^i}, \frac{Y}{Z^j}\right)$$

where the values of i and j depend on the choice of the projective coordinates. For example for homogeneous coordinates, i=1 and j=1.

The use of projective coordinates circumvents the need for division in the computation of each point addition and point doubling during the calculation of scalar multiplication. Therefore, finite field division can be avoided in the calculation of scalar multiplication, $$k\left(\frac{X_B}{Z_B^i}, \frac{Y_B}{Z_B^j}\right)$$

when using projective coordinate.

The last addition for the computation of the cipher point, $$\left(\frac{X_C}{Z_C^i}, \frac{Y_C}{Z_C^j}\right),$$

i.e. the addition of the two points $$\left(\frac{X_m}{Z_m^i}, \frac{Y_m}{Z_m^j}\right) \text{ and } k\left(\frac{X_B}{Z_B^i}, \frac{Y_B}{Z_B^j}\right)$$

can also be carried out in the chosen projection coordinate, that is $$\left(\frac{X_C}{Z_C^i}, \frac{Y_C}{Z_C^j}\right) = \left(\frac{X_m}{Z_m^i}, \frac{Y_{ml}}{Z_m^j}\right) + \left(\frac{X_B}{Z_B^i}, \frac{Y_B}{Z_B^j}\right)$$

It should be pointed out that $Z_m = 1$.

However, one division (or one inversion and one multiplication) must still be carried out to calculate $$x_C = \frac{X_C}{Z_C^i},$$

since only the affine x-coordinate of the cipher point, $x_C$, is sent by the sender.

Therefore the encryption of (N–L) bits of the secret message using elliptic curve encryption requires at least one division when using projective coordinates. Similarly, the decryption of a single message encrypted using elliptic curve cryptography also requires at least one division when using projective coordinates.

The state of elliptic curve cryptography is described in a paper by Neal Koblitz, Alfred Meneges and Scott Vanstone, Design, Codes and Cryptography 19 173-193 (2000) which is incorporated herein in its entirety by reference. More recent developments are described in the Vanstone et al. U.S. Pat. No. 6,424,712 and the published patent applications U.S. 2003/0059042 of Okeya et al., No. 2003/0123656 of Izu et al. and 2003/0142820 of Futa et al. all of which are incorporated herein by reference. An earlier U.S. Pat. No. 4,200,770 of Hellman et al. discloses an earlier cryptographic apparatus and method and is also incorporated herein by reference.

The 0059042, 0123656 and 0142820 patent applications and U.S. Pat. No. 6,424,712 address the issue of speeding up elliptic curve scale multiplications.

LIST OF FIGURES

FIG. 1: Shows the elliptic points obtained using $y_0^2 = x_0^3 + x_1^3 + x_0 x_1$. It should be noted that the points in the $x_0 y$ plane are connected to illustrate the shape of the resulting surface.

FIG. 2: Shows the elliptic points obtained using $y_0^2 + x_0 x_1 y_0 + y_0 = x_0^3 + x_1^3 + x_0^2 x_1 + x_0 x_1^2 + x_0 x_1 + x_0 + x_1$. It should be noted that the points in the $x_0 y$ plane are connected to illustrate the shape of the resulting surface.

2 BRIEF SUMMARY OF THE INVENTION

Figure 1:
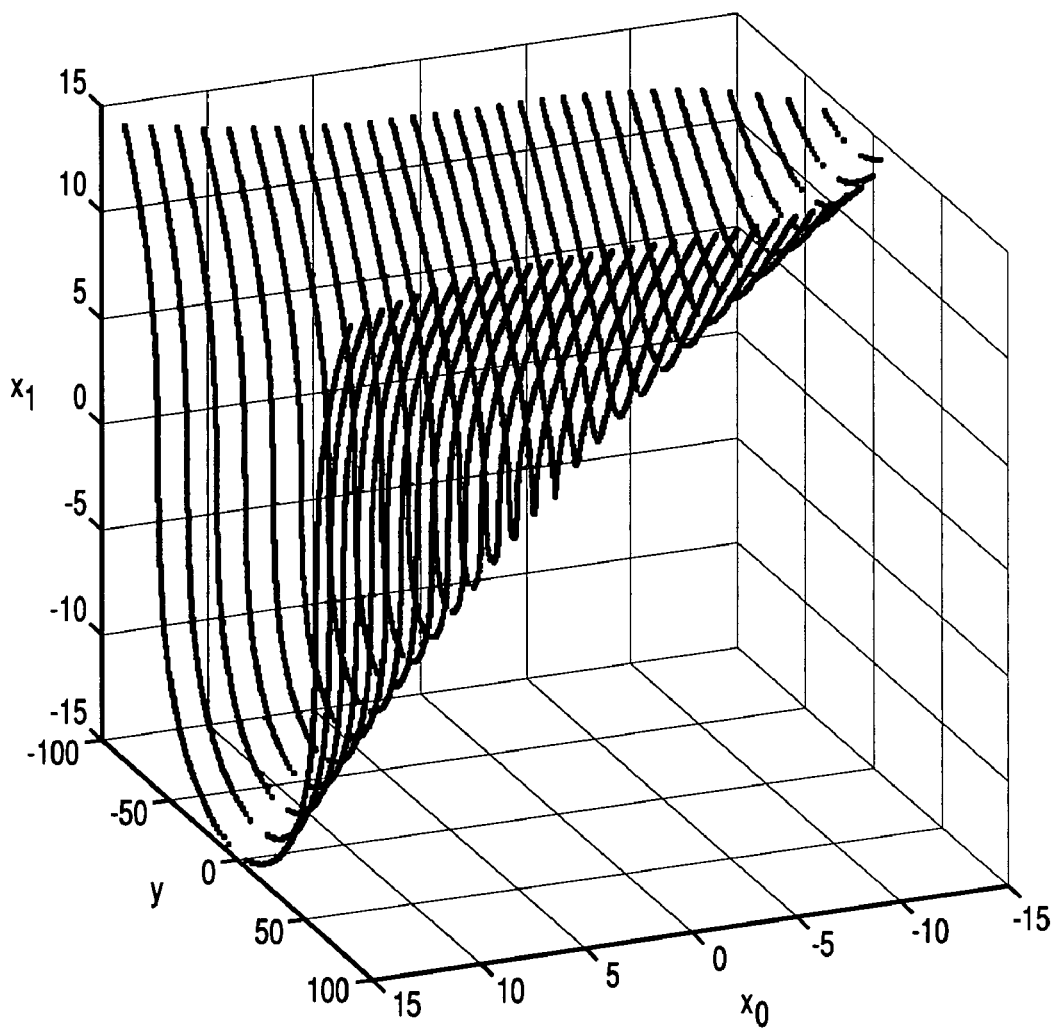

In essence, the present invention contemplates an improved method for communicating securely over an insecure channel using elliptic polynomial cryptography defined over a finite field F. The improvement comprises using more than one cubic variable to obtain an elliptic polynomial equation with multi cubic variables instead of one cubic variable that is used in conventional elliptic curve cryptography. The additional cubic variables are used to embed extra message data bits in a single elliptic point which satisfies an elliptic polynomial equation with multi cubic variables.

The cubic variables are termed the x-coordinates in this invention.

Given that nx additional x-coordinates are used with nx greater or equal to one, a resulting elliptic point has (nx+1) x-coordinates wherein all coordinates of such points are elements of a finite field F. The number of points that satisfy an elliptic polynomial equation with nx additional x-coordinates defined over F and which can be used in the corresponding cryptosystem is increased by a factor of $(\#F)^{nx}$, where # denotes the size of a field.

A nx-fold increase in the number of embedded message data bits in a single elliptic point can be achieved when embedding extra message data bits in the additional nx x-coordinates. The increase in the embedded message data bits in the improved method is achieved without any increase in the complexity of the underlying finite field arithmetic, because the addition of any two of the resulting elliptic points is defined over an extended dimensional space that incorporates the additional nx x-coordinates and wherein this addition is computed using arithmetic over a finite filed F.

Projective coordinates are used to remove an inversion or division operation at each iteration and for randomizing the computation in order to provide a counter measure against differential power analysis.

New methods for shared key cryptography and public key cryptography as well as digital signature generation and verification are also disclosed in this invention based on the invention of using an elliptic polynomial equation with more than one x-coordinate.

In the classical approach of elliptic curve cryptography, encryption and decryption, an elliptic curve point is represented using one x-coordinate (i.e. one cubic variable) and one y-coordinate (i.e. one quadratic variable) and wherein the message data bits are embedded in the x-coordinate only. Furthermore, given an elliptic curve defined over F that needs N-bit for the representation of its elements, the x-coordinate carries only (N–L) bits of the message data bits. Therefore, at least one inversion or division over F is needed per (N–L)-bit encryption.

In this invention, a new approach to elliptic polynomial cryptography is presented where the encryption of more than (N–L)-bits of the message data is achieved per one inversion or division over F.

This is achieved by defining an elliptic point addition over an extended dimensional space by using more than one x-coordinate (cubic variable) in an elliptic polynomial equation rather than a single x-coordinate (cubic variable). The use of multi x-coordinates allows the embedding of extra message data bits in the additional x-coordinates of an elliptic point, where all the coordinates of such points are elements of F represented in N-bit strings. In the new invention, necessary bits needed to recover all the coordinates of the cipher point are sent to the receiver.

At the receiving entity, all the message data bits are recovered from the relevant coordinates of the cipher point using one inversion or division over F.

In the proposed invention, projective coordinate is used at the sending and receiving entities to eliminate the inversion or division during each point addition and doubling operations of the scalar multiplication.

In theory, up to nxN extra message data bits can be embedded in a single elliptic point when using additional nx x-coordinates, with nx greater or equal to one, and wherein all the message data bits can be encrypted and subsequently decrypted using one inversion or division.

The embedding of extra message data bits in the additional x-coordinates of an elliptic point results in a significant reduction in the complexity of the underlying finite field arithmetic while maintaining the same level of security. The reason is that the number of points that satisfy an elliptic polynomial equation with nx additional x-coordinates, with nx greater or equal to one, and which can be used in the corresponding cryptosystem is increased by a factor of $(\#F)^{nx}$, where # denotes the size of a field. Hence, for the same number of embedded bits, a smaller F can be used when embedding in elliptic points with more than one x-coordinate than when embedding in elliptic points with only one x-coordinate.

An encryption and decryption method which embeds extra message data bits in a projective coordinate in addition to the extra message data bits that are embedded in the additional nx x-coordinates and wherein the addition of the corresponding elliptic points is defined over the extended dimensional space that incorporates the additional nx x-coordinates and the projective coordinate is also disclosed.

DESCRIPTION OF THE PREFERRED EMBODIMENTS OF THE INVENTION

3 Definition of Ibrahim's Equation

The degree of a variable $u^i$ is meant to be i. A polynomial is the sum of several terms which are called monomials. The total degree of a monomial $u^i v^j w^k$ is meant to be (i+j+k).

It is well known that the symbol $\epsilon$ denotes set membership.

As disclosed herein, one form of Ibrahim's elliptic polynomial equation with more than one x-coordinate is defined as follows:

It is a polynomial with more than two independent variables such that:
1. the maximum total degree of any monomial in the polynomial is three,
2. at least two variables, termed the x-coordinates, have a maximum degree of three, and each must appear in one of the monomials with a degree of three,
3. at least one variable, termed the y-coordinate, has a maximum degree of two, and must appear in one of the monomials on its own with a degree of two.

In order to illustrate some of the preferred embodiments of how to exploit more than one x-coordinate (cubic variable), it is assumed in the following that an elliptic polynomial equation contains (nx+1) x-coordinates and (ny+1) y-coordinates, wherein nx is greater than or equal to one, and ny is greater than or equal to zero.

Letting $S_{nx}$ represents the set of numbers from 0 to nx, i.e. $S_{nx}=\{0,\ldots,nx\}$, and letting $S_{ny}$ represents the set of numbers from 0 to ny, i.e. $S_{ny}=\{0,\ldots,ny\}$. Given a finite field, F, the following equation defined over F is one example of the polynomial described above, $$\sum_{k \in S_{ny}} a_{1k} y_k^2 + \sum_{k,l \in S_{ny}, l \neq k} a_{2kl} y_k y_l + \sum_{k \in S_{ny}} a_{3k} y_k + \sum_{k,l \in S_{ny}, i \in S_{nx}} c_{1kli} y_k y_l x_i + \sum_{k \in S_{ny}, i \in S_{nx}} c_{2kl} y_k x_i + \sum_{k \in S_{ny}, l, i \in S_{nx}} c_{3kli} y_k x_l x_i = \sum_{l \in S_{nx}} b_{1l} x_l^3 + \sum_{l,k \in S_{nx}, l \neq k} b_{2lk} x_l^2 x_k + \sum_{l,k \in S_{nx}} b_{3lk} x_l x_k + \sum_{k \in S_{nx}} b_{4k} x_k + b_c \quad 3.1$$

where $a_{1l}, a_{2kl}, a_{3k}, c_{1lki}, c_{2kl}, c_{3kli}, b_{1l}, b_{2lk}, b_{3lk}, b_{4k}$ & $b_c \epsilon F$.

Two possible examples of equation 3.1 are given below:

$$y_0^2 = x_0^3 + x_1^3 + x_0 x_1 \quad 3.2$$

$$y_0^2 + x_0 x_1 y_0 + y_0 = x_0^3 + x_1^3 + x_0^2 x_1 + x_0 x_1^2 + x_0 x_1 + x_0 + x_1 \quad 3.3$$

Figure 2:
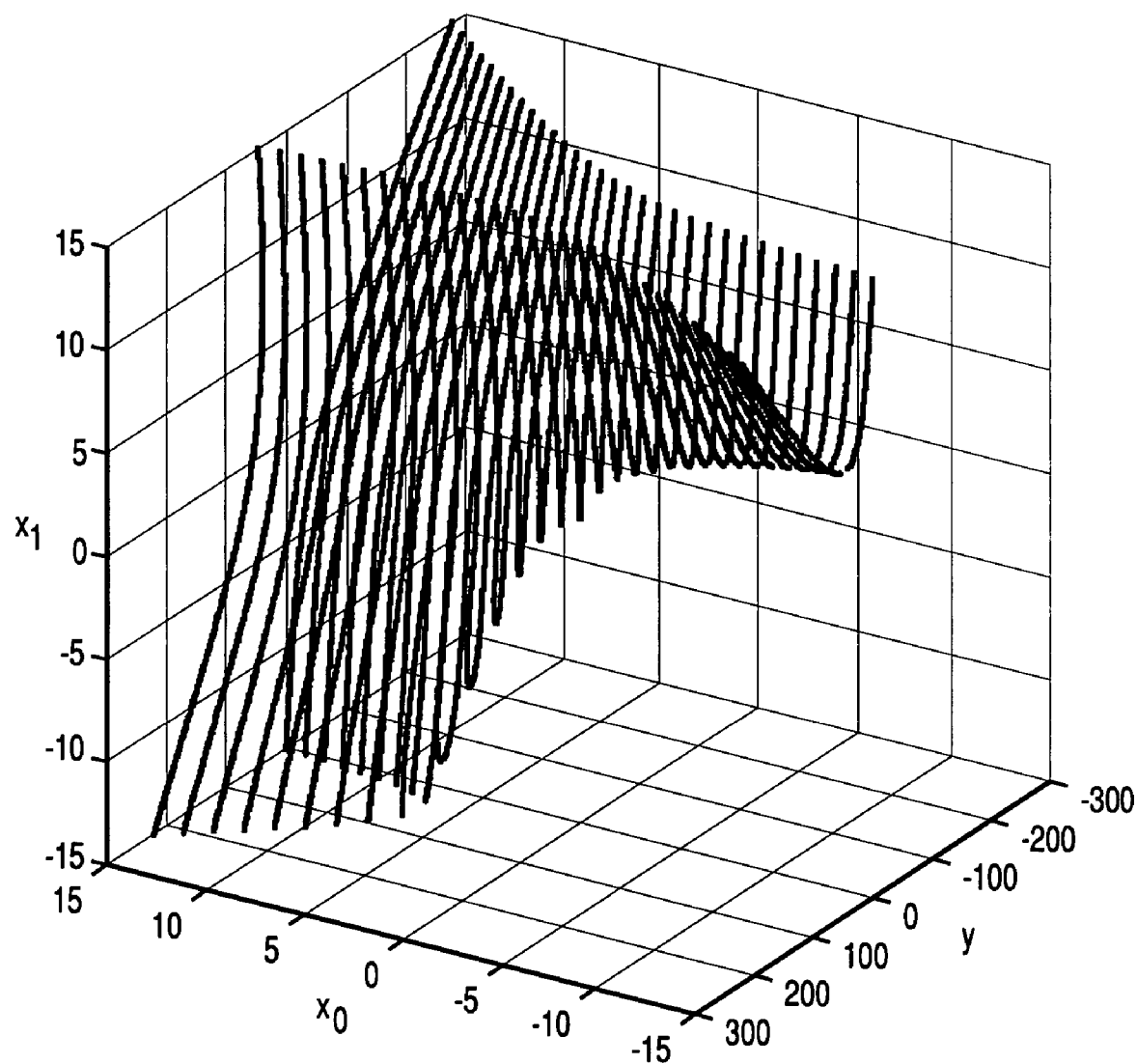

FIGS. 1 and 2 show the elliptic points obtained from equations 3.2 and 3.3 respectively. It should be noted that the points in the $x_0 y$ plane are connected to illustrate the shape of the resulting surface.

4 Use of Ibrahim Equation in the Definition of Addition of Points of an Elliptic Polynomial with Multi x-Coordinates:

Given specific coefficients $a_{1k}, a_{2kl}, a_{3k}, c_{1lki}, c_{2kl}, c_{3kli}, b_{1l}, b_{2lk}, b_{3lk}, b_{4k}$ & $b_c \epsilon F$ in equation 3.1, one can define the set of points $EC^{nx+ny+2}$ as the (nx+ny+2)-tuple $(x_0, x_1, \ldots, x_{nx}, y_0, y_1, \ldots, y_{ny})$, where $x_i, y_k \epsilon F$, $i \epsilon S_{nx}$ and $k \epsilon S_{ny}$,
(i) that are solutions of equation 3.1 but excluding the point $(0, 0, \ldots, 0)$, plus
(ii) the point at infinity, $(x_{0,I}, x_{1,I}, \ldots, x_{nx,I}, y_{0,I}, y_{1,I}, \ldots, y_{ny,I})$.

The rules for the conventional elliptic curve point addition can be adopted to define an additive binary operation, +, over $EC^{nx+ny+2}$. That is for all
$(x_{0,1}, x_{1,1}, \ldots, x_{nx,1}, y_{0,1}, y_{1,1}, \ldots, y_{ny,1}) \epsilon EC^{nx+ny+2}$ and
$(x_{0,2}, x_{1,2}, \ldots, x_{nx,2}, y_{0,2}, y_{1,2}, \ldots, y_{ny,2}) \epsilon EC^{nx+ny+2}$, the sum, $$(x_{0,3}, x_{1,3}, \ldots, x_{nx,3}, y_{0,3}, y_{1,3}, \ldots, y_{ny,3}) = (x_{0,1}, x_{1,1}, \ldots, x_{nx,1}, y_{0,1}, y_{1,1}, \ldots, y_{ny,1}) + (x_{0,2}, x_{1,2}, \ldots, x_{nx,2}, y_{0,2}, y_{1,2}, \ldots, y_{ny,2}) \quad 4.1$$

is also $(x_{0,3}, x_{1,3}, \ldots, x_{nx,3}, y_{0,3}, y_{1,3}, \ldots, y_{ny,3}) \epsilon EC^{nx+ny+2}$.

It is shown in this invention that $(EC^{nx+ny+2}, +)$ forms a pseudo-group (p-group) over addition that satisfies the following axioms:
(i) There exists $(x_{0,I}, x_{1,I}, \ldots, x_{nx,I}, y_{0,I}, y_{1,I}, \ldots, y_{ny,I}) \epsilon EC^{nx+ny+2}$ such that $(x_0, x_1, \ldots, x_{nx}, y_0, y_1, \ldots, y_{ny}) + (x_{0,I}, x_{1,I}, \ldots, x_{nx,I}, y_{0,I}, y_{1,I}, \ldots, y_{ny,I}) = (x_0, x_1, \ldots, x_{nx}, y_0, y_1, \ldots, y_{ny})$ for all $(x_0, x_1, \ldots, x_{nx}, y_0, y_1, \ldots, y_{ny}) \epsilon EC^{nx+ny+2}$,
(ii) For every $(x_0, x_1, \ldots, x_{nx}, y_0, y_1, \ldots, y_{ny}) \epsilon EC^{nx+ny+2}$ there exists an inverse $-(x_0, x_1, \ldots, x_{nx}, y_0, y_1, \ldots, y_{ny}) \epsilon EC^{nx+ny+2}$ such that $(x_0, x_1, \ldots, x_{nx}, y_0, y_1, \ldots, y_{ny}) - (x_0, x_1, \ldots, x_{nx}, y_0, y_1, \ldots, y_{ny}) = (x_{0,I}, x_{1,I}, \ldots, x_{nx,I}, y_{0,I}, y_{1,I}, \ldots, y_{ny,I})$
(iii) The additive binary operation in $(EC^{nx+ny+2}, +)$ is commutative. The p-group $(EC^{nx+ny+2}, +)$ forms a group over addition when:
(iv) The additive binary operation in $(EC^{nx+ny+2}, +)$ is associative.

Before discussing these axioms, the concept of point equivalence is described first.

4.1 Point Equivalence

Mappings can be used to indicate that an elliptic point represented using multi x-coordinates is equivalent to one or more elliptic points that satisfy the same elliptic polynomial equation, including the equivalence of an elliptic point to itself.

Points that are equivalent to each other can be substituted for each other at random or according to certain rules during point addition and/or point doubling operations. For example when using (nx+1) x-coordinates and (ny+1) y-coordinates, the addition of two points $(x_{0,1}, x_{1,1}, \ldots, x_{nx,1}, y_{0,1}, y_{1,1}, \ldots, y_{ny,1})$ & $(x_{0,2}, x_{1,2}, \ldots, x_{nx,2}, y_{0,2}, y_{1,2}, \ldots, y_{ny,2})$ is given by,
$(x_{0,3}, x_{1,3}, \ldots, x_{nx,3}, y_{0,3}, y_{1,3}, \ldots, y_{ny,3}) = (x_{0,1}, x_{1,1}, \ldots, x_{nx,1}, y_{0,1}, y_{1,1}, \ldots, y_{ny,1}) + (x_{0,2}, x_{1,2}, \ldots, x_{nx,2}, y_{0,2}, y_{1,2}, \ldots, y_{ny,2})$ If the point $(x''_{0,1}, x''_{1,1}, \ldots, x''_{nx,1}, y''_{0,1}, y''_{1,1}, \ldots, y''_{ny,1})$ is equivalent to the point $(x_{0,1}, x_{1,1}, \ldots, x_{nx,1}, y_{0,1}, y_{1,1}, \ldots, y_{ny,1})$, the former can be substituted for $(x_{0,1}, x_{1,1}, \ldots, x_{nx,1}, y_{0,1}, y_{1,1}, \ldots, y_{ny,1})$ in the above equation to obtain
$(x_{0,3}, x_{1,3}, \ldots, x_{nx,3}, y_{0,3}, y_{1,3}, \ldots, y_{ny,3}) = (x''_{0,1}, x''_{1,1}, \ldots, x''_{nx,1}, y''_{0,1}, y''_{1,1}, \ldots, y''_{ny,1}) + (x_{0,2}, x_{1,2}, \ldots, x_{nx,2}, y_{0,2}, y_{1,2}, \ldots, y_{ny,2})$ Mappings that are used to define equivalences can be based on certain properties that can exist in elliptic polynomial equations such as symmetry between variables. As an example, consider the point $(x_0, x_1, y_0)$ that satisfies the equation $y_0^2 = x_0^3 + x_1^3 + x_0 x_1$. The equivalent of this point could be defined as $(x_1, x_0, -y_0)$

4.2 Definition of the Addition Rules for $(EC^{nx+ny+2}, +)$:

Addition of two points $(x_{0,1}, x_{1,1}, \ldots, x_{nx,1}, y_{0,1}, y_{1,1}, \ldots, y_{ny,1}) \in EC^{nx+ny+2}$ and $(x_{0,2}, x_{1,2}, \ldots, x_{nx,2}, y_{0,2}, y_{1,2}, \ldots, y_{ny,2}) \in EC^{nx+ny+2}$, $$(x_{0,3}, x_{1,3}, \ldots, x_{nx,3}, y_{0,3}, y_{1,3}, \ldots, y_{ny,3}) = (x_{0,1}, x_{1,1}, \ldots, x_{nx,1}, y_{0,1}, y_{1,1}, \ldots, y_{ny,1}) + (x_{0,2}, x_{1,2}, \ldots, x_{nx,2}, y_{0,2}, y_{1,2}, \ldots, y_{ny,2}) \quad 4.2$$

is obtained as follows. Draw a straight line that passes through the two points to be added. The straight line intersects $EC^{nx+ny+2}$ at a third point, say $(x'_{0,3}, x'_{1,3}, \ldots, x'_{nx,3}, y'_{0,3}, y'_{1,3}, \ldots, y'_{ny,3}) \in EC^{nx+ny+2}$. The sum point is defined as $$(x_{0,3}, x_{1,3}, \ldots, x_{nx,3}, y_{0,3}, y_{1,3}, \ldots, y_{ny,3}) = -(x'_{0,3}, x'_{1,3}, \ldots, x'_{nx,3}, y'_{0,3}, y'_{1,3}, \ldots, y'_{ny,3}) \quad 4.3$$

It is easy to see from the above definition of the addition rule that addition over $EC^{nx+ny+2}$ is commutative, i.e.

$$(x_{0,1}, x_{1,1}, \ldots, x_{nx,1}, y_{0,1}, y_{1,1}, \ldots, y_{ny,1}) + (x_{0,2}, x_{1,2}, \ldots, x_{nx,2}, y_{0,2}, y_{1,2}, \ldots, y_{ny,2}) = (x_{0,2}, x_{1,2}, \ldots, x_{nx,2}, y_{0,2}, y_{1,2}, \ldots, y_{ny,2}) + (x_{0,1}, x_{1,1}, \ldots, x_{nx,1}, y_{0,1}, y_{1,1}, \ldots, y_{ny,1}) \quad 4.4$$

for all $(x_{0,1}, x_{1,1}, \ldots, x_{nx,1}, y_{0,1}, y_{1,1}, \ldots, y_{ny,1}) \in EC^{nx+ny+2}$ and $(x_{0,2}, x_{1,2}, \ldots, x_{nx,2}, y_{0,2}, y_{1,2}, \ldots, y_{ny,2}) \in EC^{nx+ny+2}$. This satisfies axiom (iii) above.

There are two main cases that need to be considered for the computation of point addition for $(EC^{nx+ny+2}, +)$:

A. For at least one $j \in S_{nx}$, $x_{j,1} \neq x_{j,2}$,
B. For all $j \in S_{nx}$, $x_{j,1} = x_{j,2} = x_{j,o}$. This has three sub cases,
  i. for all $k \in S_{ny}$, $y_{k,1} = y_{k,2}$, i.e.

$$(x_{0,1}, x_{1,1}, \ldots, x_{nx,1}, y_{0,1}, y_{1,1}, \ldots, y_{ny,1}) = (x_{0,2}, x_{1,2}, \ldots, x_{nx,2}, y_{0,2}, y_{1,2}, \ldots, y_{ny,2}),$$

this corresponds to point doubling,
  ii. for $k \in S_{ny}$ & $k \neq 0$, $y_{k,1} = y_{k,2}$, and where $y_{0,1}$ & $y_{0,2}$ are the roots of the following quadratic equation in $y_0$, $$a_{10}y_0^2 + \sum_{k \in S_{ny}, k \neq 0} a_{1k}y_{k,1}^2 + y_0 \left\{ \sum_{k \in S_{ny}, k \neq 0} a_{2k0}y_{k,1} + \sum_{l \in S_{ny}, l \neq 0} a_{20l}y_{l,1} \right\} + \sum_{k,l \in S_{ny}, l \neq k, l \& k \neq 0} a_{2kl}y_{k,1}y_{l,1} + a_{30}y_0 + \sum_{k \in S_{ny}, k \neq 0} a_{3k}y_{k,1} + y_0^2 \sum_{i \in S_{nx}} c_{100i}x_{i,1} + y_0 \left\{ \sum_{k \in S_{ny}, i \in S_{nx}} c_{1k0i}y_{k,1}x_{i,1} + \sum_{l \in S_{ny}, i \in S_{nx}} c_{10li}y_{l,1}x_{i,1} \right\} + \sum_{k,l \in S_{ny}, l \& k \neq 0, i \in S_{nx}} c_{1kli}y_{k,1}y_{l,1}x_{i,1} + y_0 \sum_{l \in S_{nx}} c_{20l}x_{l,1} + \sum_{k \in S_{ny}, k \neq 0, l \in S_{nx}} c_{2kl}y_{k,1}x_{l,1} + y_0 \sum_{l,i \in S_{nx}} c_{30li}x_{l,1}x_{i,1} + \sum_{k \in S_{ny}, k \neq 0, l, i \in S_{nx}} c_{3kli}y_{k,1}x_{l,1}x_{i,1} = \sum_{l \in S_{nx}} b_{1l}x_{l,1}^3 + \sum_{l,k \in S_{nx}, l \neq k} b_{2lk}x_{l,1}^2 x_{k,1} + \sum_{l,k \in S_{nx}} b_{3lk}x_{l,1}x_{k,1} + \sum_{k \in S_{nx}} b_{4k}x_{k,1} + b_c \quad 4.5$$

This case corresponds to point inverse.
  iii. all other conditions except those in cases B.i & B.ii. This case occurs only when ny is greater than or equal to one.

Case A For at least one $j \in S_{nx}, x_{j,1} \neq x_{j,2}$:

A straight line in (nx+ny+2)-dimensional space is defined by, $$\frac{y_k - y_{k,1}}{y_{k,2} - y_{k,1}} = \frac{x_j - x_{j,1}}{x_{j,2} - x_{j,1}} \quad k \in S_{ny} \text{ and } j \in S_{nx} \quad 4.6$$

and $$\frac{x_i - x_{i,1}}{x_{i,2} - x_{i,1}} = \frac{x_j - x_{j,1}}{x_{j,2} - x_{j,1}} \quad i \neq j, i \in S_{nx} \quad 4.7$$

In this case, one can write, $$y_k = m_{yk}x_j + c_{yk} \quad 4.8$$

where $$m_{yk} = \frac{y_{k,2} - y_{k,1}}{x_{j,2} - x_{j,1}} \quad 4.9$$

$$c_{yk} = y_{k,1} - x_{j,1}m_{yk} \quad 4.10$$

One can also write, $$x_i = m_{xi}x_j + c_{xi} \quad 4.11$$

where $$m_{xi} = \frac{x_{i,2} - x_{i,1}}{x_{j,2} - x_{j,1}} \quad 4.12$$

$$c_{xi} = x_{i,1} - x_{j,1}m_{xi} \quad 4.13$$

Equation 3.1 can be written as, $$\sum_{k \in S_{ny}} a_{1k}y_k^2 + \sum_{k,l \in S_{ny}, l \neq k} a_{2kl}y_k y_l + \sum_{k \in S_{ny}} a_{3k}y_k + x_j \sum_{k,l \in S_{ny}} c_{1klj}y_k y_l + \sum_{k,l \in S_{ny}, i \in S_{nx}, i \neq j} c_{1kli}y_k y_l x_i + x_j \sum_{k \in S_{ny}} c_{2kj}y_k + \sum_{k \in S_{ny}, i \in S_{nx}, i \neq j} c_{2kl}y_k x_l + x_j^2 \sum_{k \in S_{ny}} c_{3kjj}y_k + x_j \sum_{k \in S_{ny}, l \in S_{nx}, l \neq j} c_{3klj}y_k x_l + x_j \sum_{k \in S_{ny}, i \in S_{nx}, i \neq j} c_{3kji}y_k x_i + \sum_{k \in S_{ny}, l, i \in S_{nx}, l \& i \neq j} c_{3kli}y_k x_l x_i = b_{1j}x_j^3 + \sum_{l \in S_{nx}, l \neq j} b_{1l}x_l^3 + x_j^2 \sum_{k \in S_{nx}, k \neq j} b_{2jk}x_k + x_j \sum_{l \in S_{nx}, l \neq j} b_{2lj}x_l^2 + \sum_{l,k \in S_{nx}, l \neq k, j, l \neq k} b_{2lk}x_l^2 x_k + b_{3jj}x_j^2 + x_j \sum_{k \in S_{nx}, k \neq j} b_{3jk}x_k + x_j \sum_{l \in S_{nx}, l \neq j} b_{3lj}x_l + \sum_{l,k \in S_{nx}, l,k \neq j} b_{3lk}x_l x_k + b_{4j}x_j + \sum_{k \in S_{nx}, k \neq j} b_{4k}x_k + b_c \quad 4.14$$

Substituting equations 4.8 & 4.11 for $y_k$, $k \in S_{ny}$, and $x_i$, $i \in S_{nx}$ & $i \neq j$, in equation 4.14, one obtains, $$\sum_{k \in S_{ny}} a_{1k}(m_{yk}x_j + c_{yk})^2 + \sum_{k,l \in S_{ny}, l \neq k} a_{2kl}(m_{yk}x_j + c_{yk})(m_{yl}x_j + c_{yl}) + \sum_{k \in S_{ny}} a_{3k}(m_{yk}x_j + c_{yk}) + x_j \sum_{k,l \in S_{ny}} c_{1klj}(m_{yk}x_j + c_{yk})(m_{yl}x_j + c_{yl}) + \sum_{k,l \in S_{ny}, i \in S_{nx}, i \neq j} c_{1kli}(m_{yk}x_j + c_{yk})(m_{yl}x_j + c_{yl})(m_{xi}x_j + c_{xi}) + \quad 4.15$$

-continued $$x_j \sum_{k \in S_{ny}} c_{2kj}(m_{yk}x_j + c_{yk}) +$$

$$\sum_{k \in S_{ny}, l \in S_{nx}, l \neq j} c_{2kl}(m_{yk}x_j + c_{yk})(m_{xl}x_j + c_{xl}) +$$

$$x_j^2 \sum_{k \in S_{ny}} c_{3kjj}(m_{yk}x_j + c_{yk}) +$$

$$x_j \sum_{k \in S_{ny}, l \in S_{nx}, l \neq j} c_{3klj}(m_{yk}x_j + c_{yk})(m_{xl}x_j + c_{xl}) +$$

$$x_j \sum_{k \in S_{ny}, i \in S_{nx}, i \neq j} c_{3kji}(m_{yk}x_j + c_{yk})(m_{xi}x_j + c_{xi}) +$$

$$\sum_{k \in S_{ny}, l, i \in S_{nx}, l \& i \neq j} c_{3kli}(m_{yk}x_j + c_{yk})(m_{xl}x_j + c_{xl})(m_{xi}x_j + c_{xi}) =$$

$$b_{1j}x_j^3 + \sum_{l \in S_{nx}, l \neq j} b_{1l}(m_{xl}x_j + c_l)^3 + x_j^2 \sum_{k \in S_{nx}, k \neq j} b_{2jk}(m_{xk}x_j + c_{xk}) +$$

$$x_j \sum_{l \in S_{nx}, l \neq j} b_{2lj}(m_{xl}x_j + c_{xl})^2 +$$

$$\sum_{l,k \in S_{nx}, l\& k \neq j, l \neq k} b_{2lk}(m_{xl}x_j + c_{xl})^2(m_{xk}x_j + c_{xk}) + b_{3jj}x_j^2 +$$

$$x_j \sum_{k \in S_{nx}, k \neq j} b_{3jk}(m_{xk}x_j + c_{xk}) + x_j \sum_{l,k \in S_{nx}, l \neq j} b_{3lj}(m_{xl}x_j + c_{xl}) +$$

$$\sum_{l,k \in S_{nx}, l \& k \neq j} b_{3lk}(m_{xl}x_j + c_{xl})(m_{xk}x_j + c_{xk}) +$$

$$b_{4j}x_j + \sum_{k \in S_{nx}, k \neq j} a_{6k}(m_{xk}x_j + c_{xk}) + b_c$$

Expanding the terms in equation 4.15 will lead to a cubic equation in $x_j$, $$C_3 x_j^3 + C_2 x_j^2 + C_1 x_j + C_0 = 0 \qquad 4.16$$

where $C_3, C_2, C_1$ & $C_0$ can be obtained from equation 4.15 after some algebraic manipulation.

Assuming $C_3 \neq 0$, the above cubic equation in $x_j$ should have three roots $x_{j,1}, x_{j,2}$, & $x'_{j,3}$ and can be written in the following form, $$(x_j - x_{j,1})(x_j - x_{j,2})(x_j - x'_{j,3}) = 0 \qquad 4.17$$

Normalizing by the coefficient of $x^3$ in equation 4.16, and equating the coefficients of $X^2$ in the resulting equation with that in equations 4.17, one obtains a solution for $x'_{j,3}$, $$x'_{j,3} = \frac{-C_2}{C_3} - x_{j,1} - x_{j,2} \qquad 4.18$$

The values of $y'_{k,3}, k \in S_{ny}$, and $x'_{i,3}, i \in S_{nx}$ & $i \neq j$, can be obtained from equations 4.8 & 4.11 for $x_j = x'_{j,3}$.

For cases where $C_3 = 0$, equation 4.16 becomes a quadratic equation. Such quadratic equations can be used in the definition of point equivalences.

Case B: For all $j \in S_{nx}$, $x_{j,1} = x_{j,2}$

There are three sub-cases that are considered below. In all these cases, $x_{j,o}$ is defined as $x_{j,o} = x_{j,1} = x_{j,2}$, $j \in S_{nx}$.

Case B.i. For all $k \in S_{ny}$, $y_{k,1} = y_{k,2}$, which corresponds to Point Doubling:

Clearly, in this case, $$(x_{0,1}, x_{1,1}, \ldots, x_{nx,1}, y_{0,1}, y_{1,1}, \ldots, y_{ny,1}) = (x_{0,2}, x_{1,2}, \ldots, x_{nx,2}, y_{0,2}, y_{1,2}, \ldots, y_{ny,2})$$

Letting $$(x_{0,o}, x_{1,o}, \ldots, x_{nx,o}, y_{0,o}, y_{1,o}, \ldots, y_{ny,o}) = (x_{0,1}, x_{1,1}, \ldots, x_{nx,1}, y_{0,1}, y_{1,1}, \ldots, y_{ny,1}) = (x_{0,2}, x_{1,2}, \ldots, x_{nx,2}, y_{0,2}, y_{1,2}, \ldots, y_{ny,2})$$

The sum is written as, $$(x_{0,3}, x_{1,3}, \ldots, x_{nx,3}, y_{0,3}, y_{1,3}, \ldots, y_{ny,3}) = (x_{0,o}, x_{1,o}, \ldots, x_{nx,o}, y_{0,o}, y_{1,o}, \ldots, y_{ny,o}) + (x_{0,o}, x_{1,o}, \ldots, x_{nx,o}, y_{0,o}, y_{1,o}, \ldots, y_{ny,o}) \qquad 4.19$$

There are several ways of defining the addition in this case. Four possible rules are described below.

Case B.i.1: Letting $S_{nx,Lx}$ denote a subset of $S_{nx}$ with Lx elements, i.e. $S_{nx,Lx} \subseteq S_{nx}$. Letting $S_{ny,Ly}$ denote a subset of $S_{ny}$ with Ly elements and which does not include the element 0, i.e. $S_{ny,Ly} \subseteq S_{ny}$ and $0 \notin S_{ny,Ly}$. The value of Lx and Ly is at least one. The straight line in this case can be defined as a tangent to the point $(x_{0,o}, x_{1,o}, \ldots, x_{nx,o}, y_{0,o}, y_{1,o}, \ldots, y_{ny,o})$ defined in a sub-dimensional space with coordinates $y_n$ and $x_m$ with $n \in S_{ny,Ly}$ and $m \in S_{nx,Lx}$.

In this case, the gradients $m_{yn}$ and $m_{xm}$ of the straight line to be used in equation 4.18 are basically the first derivatives of $y_n$ and $x_m$, $n \in S_{ny,Ly}$ and $m \in S_{nx,Lx}$, in equation 3.1 with respect to $x_j$, $j \in S_{nx,Lx}$, i.e.

$$m_{yn} = \frac{dy_n}{dx_j} \text{ and } m_{xn} = \frac{dx_m}{dx_j}.$$

Using these derivatives for the values of the gradients, $$m_{yn} = \frac{dy_n}{dx_j}$$

where $n \in S_{ny,Ly}$ and $$m_{xn} = \frac{dx_m}{dx_j}$$

where $m \in S_{nx,Lx}$, in equation 4.18 and noting that it is assumed that $$\frac{dx_m}{dx_j} = 0,$$

for $m \in (S_{nx} - S_{nx,Lx})$ and $$\frac{dy_n}{dx_j} = 0,$$

for $n \in (S_{ny} - S_{ny,Lx})$, obtains a solution for $x'_{j,3}$.

The values of $y'_{n,3}$ for $n \in S_{ny}$ and $x'_{m,3}$, for $m \in S_{nx}$ & $m \neq j$, can be obtained from equations 4.8 & 4.11 for $x_j = x'_{j,3}$.

The choice of the $x_m$-coordinates, $m \in S_{nx,Lx}$, and $y_n$-coordinates, $n \in S_{ny,Ly}$, that can be used to compute the tangent of the straight line in this case could be chosen at random or according to a certain rule. Also, a different choice of the $x_m$-coordinates, $m \in S_{nx,Lx}$, and $y_n$-coordinates, $n \in S_{ny,Ly}$, can be made when one needs to compute successive point doublings such as that needed in scalar multiplication.

Case B.i.2: The second possible way of defining the addition of a point to itself is to apply a sequence of the point doublings according to the rule defined in Case B.i.1 and where the rule is applied with a different selection of the x-coordinate(s) and y-coordinates(s) in each step of this sequence.

Case B.i.3: Another way is to substitute a point with one of its equivalents. Letting $(x_{0,oe}, x_{1,oe}, \ldots, x_{nx,oe}, y_{0,oe}, y_{1,oe}, \ldots, y_{ny,oe})$ represents the equivalent point of $(x_{0,o}, x_{1,o}, \ldots, x_{nx,o}, y_{0,o}, y_{1,o}, \ldots, y_{ny,o})$. In this case, equation 4.19 is written as, $$(x_{0,3}, x_{1,3}, \ldots, x_{nx,3}, y_{0,3}, y_{1,3}, \ldots, y_{ny,3}) = (x_{0,o}, x_{1,o}, \ldots, x_{nx,o}, y_{0,o}, y_{1,o}, \ldots, y_{ny,o}) + (x_{0,oe}, x_{1,oe}, \ldots, x_{nx,oe}, y_{0,oe}, y_{1,oe}, \ldots, y_{ny,oe})$$

Case B.i.4: The fourth possible method is to implement point doubling as a sequence of point additions only, $$(x_{0,3}, x_{1,3}, \ldots, x_{nx,3}, y_{0,3}, y_{1,3}, \ldots, y_{ny,3}) = (((x_{0,o}, x_{1,o}, \ldots, x_{nx,o}, y_{0,o}, y_{1,o}, \ldots, y_{ny,o}) + (x_{0,R}, x_{1,R}, \ldots, x_{nx,R}, y_{0,R}, y_{1,R}, \ldots, y_{ny,R})) + (x_{0,o}, x_{1,o}, \ldots, x_{nx,o}, y_{0,o}, y_{1,o}, \ldots, y_{ny,o})) - (x_{0,R}, x_{1,R}, \ldots, x_{nx,R}, y_{0,R}, y_{1,R}, \ldots, y_{ny,R})$$

where $(x_{0,R}, x_{1,R}, \ldots, x_{nx,R}, y_{0,R}, y_{1,R}, \ldots, y_{ny,R}) \in EC^{nx+ny+2}$ is a predetermined reference point.

Case B.ii For $k \in S_{ny}$ & $k \neq 0$, $y_{k,1} = y_{k,2}$, and wherein $y_{0,1}$ & $y_{0,2}$ are the roots of the quadratic equation in $y_0$ given in equation 4.5. This case corresponds to Point Inverse.

Letting $y_{k,1} = y_{k,2} = y_{k,0}$ for $k \in S_{ny}$ & $k \neq 0$. Clearly, any two points $(x_{0,o}, x_{1,o}, \ldots, x_{nx,o}, y_{0,1}, y_{1,o}, \ldots, y_{ny,o}) \in EC^{nx+ny+2}$ and $(x_{0,o}, x_{1,o}, \ldots, x_{nx,o}, y_{0,2}, y_{1,o}, \ldots, y_{ny,o}) \in EC^{nx+ny+2}$, are in the hyper plane with $x_i = x_{i,o}, i \in S_{nx}$ and $y_k = y_{k,o}$, $k \in S_{ny}$ & $k \neq 0$. Therefore any straight line joining such two points such that $(x_{0,o}, x_{1,o}, \ldots, x_{nx,o}, y_{0,1}, y_{1,o}, \ldots, y_{ny,o}) \neq (x_{0,o}, x_{1,o}, \ldots, x_{nx,o}, y_{0,2}, y_{1,o}, \ldots, y_{ny,o})$ is also in this hyper plane.

Substituting the values of $x_{0,o}, x_{1,o}, \ldots, x_{nx,o}, y_{1,o}, \ldots, $ & $y_{ny,o}$ in an elliptic polynomial equation with multi x-coordinate and multi y-coordinates, a quadratic equation for $y_0$ is obtained as given in equation 4.5. Hence $y_0$ has only two solutions $y_{0,1}$ & $y_{0,2}$.

Therefore, a line joining the two points $(x_{0,o}, x_{1,o}, \ldots, x_{nx,o}, y_{0,1}, y_{1,o}, \ldots, y_{ny,o}) \in EC^{nx+ny+2}$ & $(x_{0,o}, x_{1,o}, \ldots, x_{nx,o}, y_{0,2}, y_{1,o}, \ldots, y_{ny,o}) \in EC^{nx+ny+2}$ does not intersect with $EC^{nx+ny+2}$ at a third point.

A line that joins such two points is assumed to intersect with $EC^{nx+ny+2}$ at the point of infinity $(x_{0,I}, x_{1,I}, \ldots, x_{nx,I}, y_{0,I}, y_{1,I}, \ldots, y_{ny,I}) \in EC^{nx+ny+2}$. This point at infinity is used to define both the inverse of a point in $EC^{nx+ny+2}$ and the identity point. According to the addition rule defined in section 4.1, one can write, $$(x_0, x_1, \ldots, x_{nx}, y_{0,1}, y_1, \ldots, y_{ny}) + (x_0, x_1, \ldots, x_{nx}, y_{0,2}, y_1, \ldots, y_{ny}) = (x_{0,I}, x_{1,I}, \ldots, x_{nx,I}, y_{0,I}, y_{1,I}, \ldots, y_{ny,I})$$
4.20 since the third point of intersection of such lines is assumed to be the point at infinity $(x_{0,I}, x_{1,I}, \ldots, x_{nx,I}, y_{0,I}, y_{1,I}, \ldots, y_{ny,I}) \in EC^{nx+ny+2}$. This equation therefore defines a unique inverse for any point $(x_o, x_1, \ldots, x_{nx}, y_0, y_1, \ldots, y_{ny}) \in EC^{nx+ny+2}$, $$-(x_0, x_1, \ldots, x_{nx}, y_{0,1}, y_1, \ldots, y_{ny}) = (x_0, x_1, \ldots, x_{nx}, y_{0,2}, y_1, \ldots, y_{ny})$$
4.21

Therefore equation 4.20 can be written as, $$(x_0, x_1, \ldots, x_{nx}, y_{0,1}, y_1, \ldots, y_{ny}) - (x_0, x_1, \ldots, x_{nx}, y_{0,1}, y_1, \ldots, y_{ny}) = (x_{0,I}, x_{1,I}, \ldots, x_{nx,I}, y_{0,I}, y_{1,I}, \ldots, y_{ny,I})$$
4.22

One can also say that a line joining the point at infinity $(x_{0,I}, x_{1,I}, \ldots, x_{nx,I}, y_{0,I}, y_{1,I}, \ldots, y_{ny,I}) \in EC^{nx+ny+2}$ and a point $(x_0, x_1, \ldots, x_{nx}, y_{0,1}, y_1, \ldots, y_{ny}) \in EC^{nx+ny+2}$, will intersect with $EC^{nx+ny+2}$ at $(x_0, x_1, \ldots, x_{nx}, y_{0,2}, y_1, \ldots, y_{ny}) \in EC^{nx+ny+2}$. Therefore, from the addition rule defined in section 4.1, one can also write, $$(x_0, x_1, \ldots, x_{nx}, y_{0,1}, y_1, y_2, \ldots, y_{ny}) + (x_{0,I}, x_{1,I}, \ldots, x_{nx,I}, y_{0,I}, y_{1,I}, \ldots, y_{ny,I}) = (x_0, x_1, \ldots, x_{nx}, y_{0,1}, y_1, \ldots, y_{ny})$$
4.23

Equation 4.22 satisfies axiom (ii) while equation 4.23 satisfies axiom (i) defined in section 4.

Case B.iii All other conditions except those in cases B.i & B.ii. This case occurs only when ny is greater than or equal to one.

Given two points $(x_{0,o}, x_{1,o}, \ldots, x_{nx,o}, y_{0,1}, y_{1,1}, \ldots, y_{ny,1}) \in EC^{nx+ny+2}$ and $(x_{0,o}, x_{1,o}, \ldots, x_{nx,o}, y_{0,2}, y_{1,2}, \ldots, y_{ny,2}) \in EC^{nx+ny+2}$ that do not satisfy the conditions of cases B.i and B.ii above, the sum point is written as, $$(x_{0,3}, x_{1,3}, \ldots, x_{nx,3}, y_{0,3}, y_{1,3}, \ldots, y_{ny,3}) = (x_{0,o}, x_{1,o}, \ldots, x_{nx,o}, y_{0,1}, y_{1,1}, \ldots, y_{ny,1}) + (x_{0,o}, x_{1,o}, \ldots, x_{nx,o}, y_{0,2}, y_{1,2}, \ldots, y_{ny,2})$$

There are several possible rules to find the sum point in this case. Three possible methods are given below:

1 Using three point doublings and one point addition, $$(x_{0,3}, x_{1,3}, \ldots, x_{nx,3}, y_{0,3}, y_{1,3}, \ldots, y_{ny,3}) = 4(x_{0,o}, x_{1,o}, \ldots, x_{nx,o}, y_{0,1}, y_{1,1}, \ldots, y_{ny,1}) - 2(x_{0,o}, x_{1,o}, \ldots, x_{nx,o}, y_{0,2}, y_{1,2}, \ldots, y_{ny,2})$$
4.24

2 Using point additions only, $$(x_{0,3}, x_{1,3}, \ldots, x_{nx,3}, y_{0,3}, y_{1,3}, \ldots, y_{ny,3}) = (((x_{0,o}, x_{1,o}, \ldots, x_{nx,o}, y_{0,1}, y_{1,1}, \ldots, y_{ny,1}) + (x_{0,R}, x_{1,R}, \ldots, x_{nx,R}, y_{0,R}, y_{1,R}, \ldots, y_{ny,R}) + (x_{0,o}, x_{1,o}, \ldots, x_{nx,o}, y_{0,2}, y_{1,2}, \ldots, y_{ny,2})) - (x_{0,R}, x_{1,R}, \ldots, x_{nx,R}, y_{0,R}, y_{1,R}, \ldots, y_{ny,R})$$
4.25 where $(x_{0,R}, x_{1,R}, \ldots, x_{nx,R}, y_{0,R}, y_{1,R}, \ldots, y_{ny,R}) \in EC^{nx+ny+2}$ is a predetermined reference point.

3 Using one point doublings and three point additions $$(x_{0,3}, x_{1,3}, \ldots, x_{nx,3}, y_{0,3}, y_{1,3}, \ldots, y_{ny,3}) = (2(x_{0,o}, x_{1,o}, \ldots, x_{nx,o}, y_{0,1}, y_{1,1}, \ldots, y_{ny,1}) + (x_{0,o}, x_{1,o}, \ldots, x_{nx,o}, y_{0,2}, y_{1,2}, \ldots, y_{ny,2})) - (x_{0,o}, x_{1,o}, \ldots, x_{nx,o}, y_{0,1}, y_{1,1}, \ldots, y_{ny,1})$$
4.26

4 Using point equivalence, $$(x_{0,3}, x_{1,3}, \ldots, x_{nx,3}, y_{0,3}, y_{1,3}, \ldots, y_{ny,3}) = (x_{0,o}, x_{1,o}, \ldots, x_{nx,o}, y_{0,1}, y_{1,1}, \ldots, y_{ny,1}) + (x_{0,oe}, x_{1,oe}, \ldots, x_{nx,oe}, y_{0,2e}, y_{1,2e}, \ldots, y_{ny,2e})$$
4.27 where $(x_{0,oe}, x_{1,oe}, \ldots, x_{nx,oe}, y_{0,2e}, y_{1,2e}, \ldots, y_{ny,2e})$ is assumed to be the equivalent point of $(x_{0,o}, x_{1,o}, \ldots, x_{nx,o}, y_{0,2}, y_{1,2}, \ldots, y_{ny,2})$.

It is significant to note that the above methods for defining the sum point are not the only ones that can be defined. These only serve as possible examples.

The choice of a method used to obtain the sum point in this case should depend on the computation complexity of point addition and point doubling.

4.3 Associativity of $(EC^{nx+ny+2}, +)$:

One way of proving associativity of $(EC^{nx+ny+2}, +)$ is as follows. Given particular elliptic polynomial equations (i.e. for particular coefficient's $a_{1l}, a_{2kl}, a_{3k}, c_{1lki}, c_{2kl}, c_{3kli}, b_{1l}, b_{2lk}, b_{3lk}, b_{4k}$ & $b_c \in F$) defined over a finite filed F. If it can be shown by algebra, computations or through other means that $(Q+(R+S)) = ((Q+R)+S)$ for any three points Q, R, $S \in EC^{nx+ny+2}$, the corresponding $(EC^{nx+ny+2}, +)$ based on such polynomials are associative.

4.4 Example of Case A in Point Addition for nx=1 and ny=0:

The following elliptic polynomial equation with nx=1 and ny=0 is used to show an example of the equations in Case A used in point addition, $$y_0^2 = x_0^3 + x_1^3 + x_0 x_1 \quad\quad 4.27$$

Choosing $x_j = x_0$, and substituting equation 4.8 for $y_0$ and equation 4.11 for $x_1$, in equation 4.27, one obtains, $$(m_{y0}x_0 + c_{y0})^2 = x_0^3 + (m_{x1}x_0 + c_{x1})^3 + x_0(m_{x1}x_0 + c_{x1})$$

Expanding the terms in brackets one obtains, $$m_{y0}^2 x_0^2 + 2m_{y0}c_{y0}x_0 + c_{y0}^2 = x_0^3 + m_{x1}^3 x_0^3 + 3m_{x1}^2 c_{x1} x_0^2 + 3m_{x1}c_{x1}^2 x_0 + c_{x1}^3 + m_{x1}x_0^2 + c_{x1}x_0$$

or $$(1+m_{x1}^3)x_0^3 + (3m_{x1}^2 c_{x1} + m_{x1} - m_{y0}^2)x_0^2 + (3m_{x1}c_{x1}^2 + c_{x1} - 2m_{y0}c_{y0})x_0 + c_{x1}^3 - c_{y0}^2 = 0 \quad\quad 4.28$$

From equation 4.18, one obtains the solution for $x'_{0,3}$ in this case, $$x'_{0,3} = \frac{-(3m_{x1}^2 c_{x1} + m_{x1} - m_{y0}^2)}{(1+m_{x1}^3)} - x_{j,1} - x_{j,2}$$

The values of $y'_{0,3}$ and $x'_{1,3}$ can be obtained from equations 4.8 & 4.11 for $x_0 = x'_{0,3}$. It is worth noting that when $m_{x1} = -1$, the coefficient of the cubic term in equation 4.28 is zero, i.e. $C_3 = 0$. In this case, the resulting quadratic equation can be used in the definition of point equivalences for the points that satisfy equation 4.27.

5 Projective Coordinate

Each of the equations for point addition and point doublings derived for cases A and B in section 4 require modular inversion or division. In cases where field inversions or divisions are significantly more expensive than multiplication, projective coordinates are used to remove the requirement for field inversion or division from these equations as discussed below.

Several projective coordinates can be used. In this invention, the Jacobean projective coordinate is used as an example, viz $$x_i = \frac{X_i}{V^2} \text{ for } i \in S_{nx} \quad\quad 5.1.a$$

$$y_k = \frac{Y_k}{V^3} \text{ for } k \in S_{ny} \quad\quad 5.1.b$$

Using Jacobian projection in equation 3.1, one obtains, $$\sum_{k \in S_{ny}} a_{1k}\frac{Y_k^2}{V^6} + \sum_{k,l \in S_{ny}, l \neq k} a_{2kl}\frac{Y_k}{V^3}\frac{Y_l}{V^3} + \sum_{k \in S_{ny}} a_{3k}\frac{Y_k}{V^3} + \sum_{k,l \in S_{ny}, i \in S_{nx}} c_{1kli}\frac{Y_k}{V^3}\frac{Y_l}{V^3}\frac{X_i}{V^2} + \sum_{k \in S_{ny}, l \in S_{nx}} c_{2kl}\frac{Y_k}{V^3}\frac{X_l}{V^2} + \sum_{k \in S_{ny}, l, i \in S_{nx}} c_{3kli}\frac{Y_k}{V^3}\frac{X_l}{V^2}\frac{X_i}{V^2} = \sum_{l \in S_{nx}} b_{1l}\frac{X_l^3}{V^6} + \quad\quad 5.2$$

-continued $$\sum_{l,k \in S_{nx}, l \neq k} b_{2lk}\frac{X_l^2}{V^4}\frac{X_k}{V^2} + \sum_{l,k \in S_{nx}} b_{3lk}\frac{X_l}{V^2}\frac{X_k}{V^2} + \sum_{k \in S_{nx}} b_{4k}\frac{X_k}{V^2} + b_c$$

which can be rewritten as, $$\sum_{k \in S_{ny}} a_{1k}Y_k^2 V^2 + \sum_{k,l \in S_{ny}, l \neq k} a_{2kl}Y_k Y_l V^2 + \sum_{k \in S_{ny}} a_{3k}Y_k V^5 + \sum_{k,l \in S_{ny}, i \in S_{nx}} c_{1kli}Y_k Y_l X_i + \sum_{k \in S_{ny}, l \in S_{nx}} c_{2kl}Y_k X_l V^3 + \sum_{k \in S_{ny}, l, i \in S_{nx}} c_{3kli}Y_k X_l X_i V = \sum_{l \in S_{nx}} b_{1l}X_l^3 V^2 + \sum_{l,k \in S_{nx}, l \neq k} b_{2lk}X_l^2 X_k V^2 + \sum_{l,k \in S_{nx}} b_{3lk}X_l X_k V^4 + \sum_{k \in S_{nx}} b_{4k}X_k V^6 + b_c V^8 \quad\quad 5.3$$

In what follows, the points $(X_0, X_1, \ldots, X_{nx}, Y_0, Y_1, \ldots, Y_{ny}, V)$ are assumed to satisfy equation 5.3.

When $V \neq 0$, the projected point $(X_0, X_1, \ldots, X_{nx}, Y_0, Y_1, \ldots, Y_{ny}, V)$ corresponds to the point, $$(x_0, x_1, \ldots, x_{nx}, y_0, y_1, \ldots, y_{ny}) = \left(\frac{X_0}{V^2}, \frac{X_1}{V^2}, \ldots, \frac{X_{nx}}{V^2}, \frac{Y_0}{V^3}, \frac{Y_1}{V^3}, \ldots, \frac{Y_{ny}}{V^3}\right)$$

which satisfies equation 3.1.

Using Jacobean projective coordinate, equation 4.1 can be written as, $$\left(\frac{X_{0,3}}{V_3^2}, \frac{X_{1,3}}{V_3^2}, \ldots, \frac{X_{nx,3}}{V_3^2}, \frac{Y_{0,3}}{V_3^3}, \frac{Y_{1,3}}{V_3^3}, \ldots, \frac{Y_{ny,3}}{V_3^3}\right) = \left(\frac{X_{0,1}}{V_1^2}, \frac{X_{1,1}}{V_1^2}, \ldots, \frac{X_{nx,1}}{V_1^2}, \frac{Y_{0,1}}{V_1^3}, \frac{Y_{1,1}}{V_1^3}, \ldots, \frac{Y_{ny,1}}{V_1^3}\right) + \left(\frac{X_{0,2}}{V_2^2}, \frac{X_{1,2}}{V_2^2}, \ldots, \frac{X_{nx,2}}{V_2^2}, \frac{Y_{0,2}}{V_2^3}, \frac{Y_{1,2}}{V_2^3}, \ldots, \frac{Y_{ny,2}}{V_2^3}\right) \quad\quad 5.4$$

By using the Jacobian projective coordinate in the equations of Cases A and B described in section 4 above and by an appropriate choice of the value of $V_3$, it can be shown that point doubling and point addition can be computed without the need for field inversion or division.

6 Elliptic Polynomial Cryptography with Multi x-Coordinates:

6.1 Symmetric Elliptic Polynomial Cryptography with Multi x-Coordinates:

In symmetric cryptography, a shared secret key or keys are used to encrypt and decrypt the message data bits. One approach of symmetric elliptic polynomial cryptography with multi x-coordinates based on a single shared secret key is carried out as follows:

1 Both the sending and receiving correspondent agree on the values of nx & ny, and the set of coefficients $a_{1k}, a_{2kl}, a_{3k}, c_{1lki}, c_{2kl}, c_{3kli}, b_{1l}, b_{2lk}, b_{3lk}, b_{4k}$ & $b_c \in F$. They also need to agree on (i) a random number, k, that will be the shared secret key for communication, and (ii) a base point, $(x_{0,B}, x_{1,B}, \ldots, x_{nx,B}, y_{0,B}, y_{1,B}, \ldots, y_{ny,B}) \in EC^{xn+ny+2}$.

The sending correspondent performs the following steps,

2 Embed the secret message bit string into the (nx+1) x-coordinates, $x_0, x_1, \ldots \& x_{nx}$, and the ny y-coordinates, $y_1, \ldots \& y_{ny}$, of the elliptic message point, $(x_{0,m}, x_{1,m}, \ldots, x_{nx,m}, y_{0,m}, y_{1,m}, \ldots, y_{ny,m}) \in EC^{nx+ny+2}$. A possible method of embedding the message bits is described in section 6.4.

3 Using the shared key, k, and the base point $(x_{0,B}, x_{1,B}, \ldots, x_{nx,B}, y_{0,B}, y_{1,B}, \ldots, y_{ny,B})$ the scalar multiplication $k(x_{0,B}, x_{1,B}, \ldots, x_{nx,B}, y_{0,B}, y_{1,B}, \ldots, y_{ny,B})$ is computed.

4 The cipher point $(x_{0,c}, x_{1,c}, \ldots, x_{nx,c}, y_{0,c}, y_{1,c}, \ldots, y_{ny,c})$ is computed using, $$(x_{0,c}, x_{1,c}, \ldots, x_{nx,c}, y_{0,c}, y_{1,c}, \ldots, y_{ny,c}) = (x_{0,m}, x_{1,m}, \ldots, x_{nx,m}, y_{0,m}, y_{1,m}, \ldots, y_{ny,m}) + k(x_{0,B}, x_{1,B}, \ldots, x_{nx,B}, y_{0,B}, y_{1,B}, \ldots, y_{ny,B})$$

5 The appropriate bits of the x-coordinates, $x_{0,c}, x_{1,c}, \ldots \& x_{nx,c}$, and y-coordinates $y_{1,c}, \ldots \& y_{ny,c}$ of the cipher point, and if need be any additional information needed to help recover the message bit string without compromising security are sent to the receiving correspondent.

At the receiving correspondent, the following steps are performed,

6 Using the shared key, k, and the base point $(x_{0,B}, x_{1,B}, \ldots, x_{nx,B}, y_{0,B}, y_{1,B}, \ldots, y_{ny,B})$ and any additional information received from the sending correspondent, compute the scalar multiplication $k(x_{0,B}, x_{1,B}, \ldots, x_{nx,B}, y_{0,B}, y_{1,B}, \ldots, y_{ny,B})$.

7 Compute the message point $(x_{0,m}, x_{1,m}, \ldots, x_{nx,m}, y_{0,m}, y_{1,m}, \ldots, y_{ny,m})$ using, $$(x_{0,m}, x_{1,m}, \ldots, x_{nx,m}, y_{0,m}, y_{1,m}, \ldots, y_{ny,m}) = (x_{0,c}, x_{1,c}, \ldots, x_{nx,c}, y_{0,c}, y_{1,c}, \ldots, y_{ny,c}) - k(x_{0,B}, x_{1,B}, \ldots, x_{nx,B}, y_{0,B}, y_{1,B}, \ldots, y_{ny,B})$$

and using any additional information received from the sending entity.

8 Recover the secret message bit string from the (nx+1) x-coordinates, $x_{0,m}, x_{1,m}, \ldots \& x_{nx,m}$, and the ny y-coordinates, $y_{1,m}, \ldots \& y_{ny,m}$, and using any additional information received from the sending entity.

6.2 Public Key Elliptic Polynomial Cryptography with Multi x-Coordinates:

In public key cryptography, the sending and receiving correspondent use their own private key or keys and public key or keys. In one embodiment, each correspondent uses a single private key, $k_{Pr}$, and a single public key, $$(x_{0,Pu}, x_{1,Pu}, \ldots, x_{nx,Pu}, y_{0,Pu}, y_{1,Pu}, \ldots, y_{ny,Pu}) = k_{Pr}(x_{0,B}, x_{1,B}, \ldots, x_{nx,B}, y_{0,B}, y_{1,B}, \ldots, y_{ny,B})$$

The sending correspondent uses its private key and the receiving correspondent public key to perform encryption of the secret message bits. The receiving correspondent uses its private key and the sending correspondent public key to perform decryption. Such a public key cryptography method comprises the following steps:

embedding a message bit string into the (nx+1) x-coordinates, $x_0, x_1, \ldots \& x_n$, and the ny y-coordinates, $y_1, \ldots, \& y_{ny}$, of an elliptic point which is designated as the message point, $(x_{0,m}, x_{1,m}, \ldots, x_{nx,m}, y_{0,m}, y_{1,m}, \ldots, y_{ny,m})$;

using the private key of the sending correspondent, $k_{SPr}$, and the public key of the receiving correspondent, $k_{RPr}(x_{0,B}, x_{1,B}, \ldots, x_{nx,B}, y_{0,B}, y_{1,B}, \ldots, y_{ny,B})$, to compute the scalar multiplication $(x_{0,bk}, x_{1,bk}, \ldots, x_{nx,bk}, y_{0,bk}, y_{1,bk}, \ldots, y_{ny,bk})$ $= k_{SPr}(k_{RPr}(x_{0,B}, x_{1,B}, \ldots, x_{nx,B}, y_{0,B}, y_{1,B}, \ldots, y_{ny,B}))$ computing a cipher point, $(x_{0,c}, x_{1,c}, \ldots, x_{nx,c}, y_{0,c}, y_{1,c}, \ldots, y_{ny,c})$, using $$(x_{0,c}, x_{1,c}, \ldots, x_{nx,c}, y_{0,c}, y_{1,c}, \ldots, y_{ny,c}) = (x_{0,m}, x_{1,m}, \ldots, x_{nx,m}, y_{0,m}, y_{1,m}, \ldots, y_{ny,m}) + (x_{0,bk}, x_{1,bk}, \ldots, x_{nx,bk}, y_{0,bk}, y_{1,bk}, \ldots, y_{ny,bk});$$

sending appropriate bits of the (nx+1) the x-coordinates, $x_{0,c}, x_{1,c}, \ldots \& x_{nx,c}$, and the ny y-coordinates, $y_{1,c}, \ldots \& y_{ny,c}$, of the cipher point, and if need be any additional information needed to help the receiving correspondent recover the message bit string without compromising security;

using the private key of the receiving correspondent, $k_{RPr}$, and the public key of the sending correspondent, $k_{SPr}(x_{0,B}, x_{1,B}, \ldots, x_{nx,B}, y_{0,B}, y_{1,B}, \ldots, y_{ny,B})$, and any additional information received from the sending correspondent, compute the point $(x_{0,bk}, x_{1,bk}, \ldots, x_{nx,bk}, y_{0,bk}, y_{1,bk}, \ldots, y_{ny,bk})$ or its equivalent, $$(x_{0,bke}, x_{1,bke}, \ldots, x_{nx,bke}, y_{0,bke}, y_{1,bke}, \ldots, y_{ny,bke}) = k_{RPr}(k_{SPr}(x_{0,B}, x_{1,B}, \ldots, x_{nx,B}, y_{0,B}, y_{1,B}, \ldots, y_{ny,B}))$$

wherein the point $(x_{0,bke}, x_{1,bke}, \ldots, x_{nx,bke}, y_{0,bke}, y_{1,bke}, \ldots, y_{ny,bke})$ is equivalent to the point $(x_{0,bk}, x_{1,bk}, \ldots, x_{nx,bk}, y_{0,bk}, y_{1,bk}, \ldots, y_{ny,bk})$;

computing the message point $(x_{0,m}, x_{1,m}, \ldots, x_{nx,m}, y_{0,m}, y_{1,m}, \ldots, y_{ny,m})$ using $$(x_{0,m}, x_{1,m}, \ldots, x_{nx,m}, y_{0,m}, y_{1,m}, \ldots, y_{ny,m}) = (x_{0,c}, x_{1,c}, \ldots, x_{nx,c}, y_{0,c}, y_{1,c}, \ldots, y_{ny,c}) - (x_{0,bk}, x_{1,bk}, \ldots, x_{nx,bk}, y_{0,bk}, y_{1,bk}, \ldots, y_{ny,bk})$$

and any additional information received from the sending correspondent recovering the message bit string from the (nx+1) x-coordinates, $x_{o,m}, x_{1,m}, \ldots \& x_{nx,m}$, and the ny y-coordinates, $y_{1,m}, \ldots \& y_{ny,m}$, and using any additional information received from the sending correspondent.

6.3 Elliptic Polynomial Digital Signature with Multi x-Coordinates:

All the schemes used for digital signatures that are based on the representation of elliptic points in affine coordinates can be adopted for elliptic polynomial digital signature with multi x-coordinates.

This can be achieved either directly or with some modifications that exploit the additional x-coordinates in generating an elliptic polynomial digital signature with multi x-coordinates.

A conventional elliptic curve digital signature can be basically summarized as follows. A more detailed description can be found in [N. Kobltiz, A. Menezes, S. Vanstone, The state of Elliptic Curve Cryptography, Designs, Codes, and Cryptography, Vol 19, 2000, pp 173-193.]. The entity which generates a signature has a private key, $k_{Pr}$, and a public key, $(x_{Pu}, y_{Pu}) = k_{Pr}(x_B, y_B)$. Given a message M, the entity generating the signature performs the following steps, 1 select a random integer, k, mod p,
2 compute $(x_1, y_1) = k(x_B, y_B)$ and convert $x_1$ into an integer r mod p,
3 compute a message digest, digest(M), which is a bit string that is dependant on the message, and convert the bit string into an integer e,
4 compute $s = k^{-1}(e + k_{Pr}r)$ mod p,
5 signature of the message M is (r,s).

The signature is verified at the receiving entity using the following steps, 1 compute a message digest, digest(M), and convert the bit string into an integer e, 2 compute $u_1=es^{-1}$ mod p and $u_2=rs^{-1}$ mod p,
3 compute $(x_2,y_2)=u_1(x_B,y_B)+u_2(x_{Pu},y_{Pu})$, and convert $x_2$ into an integer v modp,
4 accept the signature if v=r.

In one embodiment of using (nx+1) coordinates, $x_0$, $x_1, \ldots, \& x_{nx}$, for generating a digital signature, the above elliptic curve digital signature can be modified as follows. The entity which generates a signature has a private key, $k_{Pr}$, and a public key, $$(x_{0,Pu},x_{1,Pu},\ldots,x_{nx,Pu},y_{Pu})=k_{Pr}(x_{0,B},x_{1,B},\ldots,x_{nx,B},y_B)$$

Given a message M, the entity generating the signature performs the following steps,
1 select a random integer, k, mod p,
2 compute $$(x_{0,1},x_{1,1},\ldots,x_{nx,1},y_1)=k(x_{0,B},x_{1,B},\ldots,x_{nx,B},y_B)$$

and concatenate the bits of $x_{0,1},x_{1,1},\ldots,\& x_{nx,1}$ together to form a single string $[x_{0,1}:x_{1,1}:\ldots:x_{nx,1}]$ and convert the combined bit string into an integer r mod p,
3 compute a message digest, digest(M), and convert the bit string into an integer e,
4 compute $s=k^{-1}(e+k_{Pr}r)$ mod p,
5 signature of the message M is (r,s).

The signature is verified at the receiving entity using the following steps,
1 compute a message digest, digest(M), and convert the bit string into an integer e,
2 compute $u_1=es^{-1}$ mod p and $u_2=rs^{-1}$ mod p,
3 compute $$(x_{0,2},x_{1,2},\ldots,x_{nx,2},y_2)=u_1(x_{0,B},x_{1,B},\ldots,x_{nx,B},y_B)+u_2(x_{0,Pu},x_{1,Pu},\ldots,x_{nx,Pu},y_{Pu})$$

and concatenate the bits of $x_{0,2},x_{1,2},\ldots,\& x_{nx,2}$ together to form a single string $[x_{0,1}:x_{1,1}:\ldots:x_{nx,1}]$ and convert the combined bit string into an integer v mod p,
4 accept the signature if v=r.

6.4 Data Embedding in Elliptic Points with Multi x-Coordinates:

One embodiment of the embedding of a message bit string into an elliptic point that satisfies an elliptic polynomial equation with (nx+1) x-coordinates and (ny+1) y-coordinates can be carried out as follows:

dividing the message bit string into M-bit strings where ((nx+ny+1)N−L)>M>(N−L), dividing each M-bit string into (nx+ny+1) strings $mx_0$, $mx_1, \ldots, mx_{nx}, my_1, \ldots, \& my_{ny}$, wherein the length of string $mx_0$ must be no more than (N−L) bits, while the length of each of the other "nx+ny" strings $mx_1, \ldots, mx_{nx}, my_1, \ldots, \& my_{ny}$ must be no more than N bits, and wherein each one of the (nx+ny+1) bit strings must have an equivalent value which is an element of the underlying finite field F, assigning the value of the bit strings of $mx_1, \ldots, \& mx_{nx}$ to $x_1, \ldots \& x_{nx}$, assigning the value of the bit strings of $my_1, \ldots, \& my_{ny}$ to $y_1, \ldots \& y_{ny}$, assigning the value of the bit string of $mx_0$ to $x_0$ substituting the values of $x_0, x_1, \ldots, \& x_{nx}$ and $y_1, \ldots \& y_{ny}$ in a selected elliptic polynomial equation with (nx+1) x-coordinates and (ny+1) y-coordinates to form a quadratic equation in $y_0$, $$y_0^2+Ay_0+B=0$$

If the quadratic equation in $y_0$ has solutions for $y_0$ wherein the solutions are elements of the finite field F, assign one of the solutions to $y_0$ at random or according to a certain rule, otherwise, continue incrementing $x_0$ until a quadratic equation of $y_0$ is formed that has solutions in the finite filed F. Once such solutions are obtained, assign one of the solutions to $y_0$ at random or according to a certain rule.

It should be noted that in the case of quadratic equations with A=0, the Legendre symbol can be used as an efficient test for the existence of a solution of the quadratic equation above.

7 Security of Elliptic Polynomial Cryptography with Multi x-Coordinates:

The security of elliptic polynomial cryptography with multi x-coordinates is assessed in the following aspects:
1 the effect on the solution of Elliptic Curve Discrete Logarithmic Problem (ECDLP),
2 power analysis attacks.

7.1 ECDLP in Elliptic Polynomial Cryptography with Multi x-Coordinates:

It is well known that the elliptic curve discrete logarithm problem (ECDLP) is apparently intractable for non-singular elliptic curves. The ECDLP problem can be stated as follows: given an elliptic curve defined over a finite field F that need N-bit for the representation of its elements, an elliptic curve point $(x_P,y_P) \in EC^2$ defined in affine coordinates, and a point $(x_Q,y_Q) \in EC^2$ defined in affine coordinates, determine the integer k, $0 \leq k \leq \#F$, such that $(x_Q,y_Q)=k(x_P,y_P)$ provided that such an integer exist. In what follows, it is assumed that such an integer exists.

The apparent intractability of the following elliptic curve discrete logarithm problem (ECDLP) is the basis of the security of elliptic polynomial cryptosystems with multi x-coordinates. It is assumed that a selected elliptic polynomial equation with additional x-coordinates for use in an elliptic polynomial cryptosystem with multi x-coordinates has a surface or hyper-surface that is non-singular. A non-singular surface or hyper-surface is such that the partial first derivatives at any non-trivial point on the surface or hyper-surface are not all equal to zero.

The ECDLP in elliptic polynomial cryptosystems with multi x-coordinates can be stated as follows: given a point $(x_{0,P},x_{1,P},\ldots,x_{nx,P},y_{0,P},y_{1,P},\ldots,y_{ny,P}) \in EC^{nx+ny+2}$ and a point $(x_{0,Q},x_{1,Q},\ldots,x_{nx,Q},y_{0,Q},y_{1,Q},\ldots,y_{ny,Q}) \in EC^{nx+ny+2}$, determine an integer k, $0 \leq k \leq \#F$ such that $(x_{0,Q},x_{1,Q},\ldots,x_{nx,Q},y_{0,Q},y_{1,Q},\ldots,y_{ny,Q})=k(x_{0,P},x_{1,P},\ldots,x_{nx,P},y_{0,P},y_{1,P},\ldots,y_{ny,P})$ provided that such an integer exist.

The most well known attack used against the ECDLP is Pollard p-method, which has a complexity of $O(\sqrt{\pi K}/2)$, where K is the order of the underlying group and the complexity is measured in terms of an elliptic curve point addition N. Kobltiz, A. Menezes, S. Vanstone, The state of Elliptic Curve Cryptography, Designs, Codes, and Cryptography, Vol 19, 2000, pp 173-193.

In elliptic polynomial cryptosystems with multi xcoordinates, the modified Pollard p-method can be formulated as follows: find two points $$(x_{0,i},x_{1,i},\ldots,x_{nx,i},y_{0,i},y_{1,i},\ldots,y_{ny,i})=A_i(x_{0,Q},x_{1,Q},\ldots,x_{nx,Q},y_{0,Q},y_{1,Q},\ldots,y_{ny,Q})+B_i(x_{0,P},x_{1,P},\ldots,x_{nx,P},y_{0,P},y_{1,P},\ldots,y_{ny,P})$$

and $$(x_{0,j},x_{1,j},\ldots,x_{nx,j},y_{0,j},y_{1,j},\ldots,y_{ny,j})=A_j(x_{0,Q},x_{1,Q},\ldots,x_{nx,Q},y_{0,Q},y_{1,Q},\ldots,y_{ny,Q})+B_j(x_{0,P},x_{1,P},\ldots,x_{nx,P},y_{0,P},y_{1,P},\ldots,y_{ny,P})$$

such that $$(x_{0,i}, x_{1,i}, \ldots, x_{nx,i}, y_{0,i}, y_{1,i}, \ldots, y_{ny,i}) = (x_{0,j}, x_{1,j}, \ldots, x_{nx,j}, y_{0,j}, y_{1,j}, \ldots, y_{ny,j})$$

and hence $$k = \frac{A_i + A_j}{B_i + B_j},$$

and given that all the points are members of $EC^{nx+ny+2}$.

It is clear that the complexity of the Pollard p-method in elliptic polynomial cryptosystems with multi x-coordinates defined over F is $O(\sqrt{\pi(\#EC^{nx+ny+2})}/2)$ and where $\#EC^{nx+ny+2}$ is proportional to $\#(F(p))^{nx+ny+1}$ and # denotes the order of a field or group.

7.2 Security Against SPA and DPA:

Simple and differential power analysis can be used to attack elliptic polynomial cryptosystems with multi x-coordinates in a similar manner in which they are used to attack elliptic curve cryptosystems.

The countermeasures that are used against simple and differential power analysis for elliptic curve cryptosystems are also applicable for elliptic polynomial cryptosystems with multi x-coordinates. For example, the countermeasures proposed by J-S Coron, in "Resistance Against Differential Power Analysis for Elliptic Curve Cryptosystems, Cryptographic Hardware and Embedded Systems, Vol. 1717, Lecture Notes in Computer Science, pp 292-302, Springer-Verlag, 1999", can all be adopted as countermeasures against power analysis in elliptic polynomial cryptosystems with multi x-coordinates. As an example, the randomized projective coordinate method can be applied in elliptic polynomial cryptosystems with multi x-coordinates by randomizing the coordinates of the projective coordinates, that is $(X_0 X_1, \ldots, X_{nx}, Y_0, Y_1, \ldots, Y_{ny}, V) = (X_0 \lambda^2, X_1 \lambda^2, \ldots, X_{nx} \lambda^2, Y_0 \lambda^3, Y_1 \lambda^3, \ldots, Y_{ny} \lambda^3, V\lambda)$ where $\lambda$ is a random variable.

8. Projective Coordinates to Embed Extra Message Data Bits:

Projective coordinate can also be used by the sending correspondent and the receiving correspondent to embed extra message data bits in the projective coordinate wherein the addition of the corresponding elliptic points is defined in an extended dimensional space that incorporates the additional x-coordinates and a projective coordinate.

The equations for the addition rule can be obtained following a similar approach as discussed earlier. For example when using an elliptic polynomial equation with (nx+1) x-coordinates and (nx+1) y-coordinates in projective coordinate, a straight line equation is substituted for each variable to obtain a cubic equation in terms of one of the x-coordinates. This cubic equation can be used to identify the third point of intersection between a straight line and the elliptic polynomial in (nx+ny+3) dimensions given two other intersection points. This third point of intersection is used to identify the sum of the given two points.

9 Scalar Multiplication over a Sub-dimensional Space

In section 4, point addition and point doubling are defined over the entire dimensional space which contains all the coordinates. The corresponding scalar multiplication which is implemented as a sequence of point additions and point doublings is therefore defined over the entire dimensional space which contains all the coordinates.

It is possible, however, to define scalar multiplication over a sub-dimensional space which does not contain all the coordinates, but must contain at least one x-coordinate and one y-coordinate. In this case, the corresponding point addition and point doubling are defined in the sub-dimensional space. The variables that denote other coordinates that are not contained in a selected sub-dimensional space are considered to be constants.

Furthermore, a sequence of scalar multiplications can also be defined over different sub-dimensional spaces that contain different x-coordinates and y-coordinates.

Legendre Symbol

The Legendre Symbol is used to test whether an element of F(p) has a square root or not, i.e. whether an element is quadratic residue or not. This implies that one does not need to compute the square root to check if an element has a square root or not. The Legendre Symbol and test is described below:

Given an element of a finite field F(p), say d, the Legendre symbol is defined as $$\left(\frac{d}{p}\right).$$

To test whether d is quadratic residue or not, the Legendre symbol, $$\left(\frac{d}{p}\right),$$

is used:

$$\left(\frac{d}{p}\right) = \begin{cases} +1 & \text{if } x \text{ is quadratic residue} \\ 0 & \text{if } x \equiv 0 \bmod F(p) \\ -1 & \text{otherwise} \end{cases}$$

Figure 3:
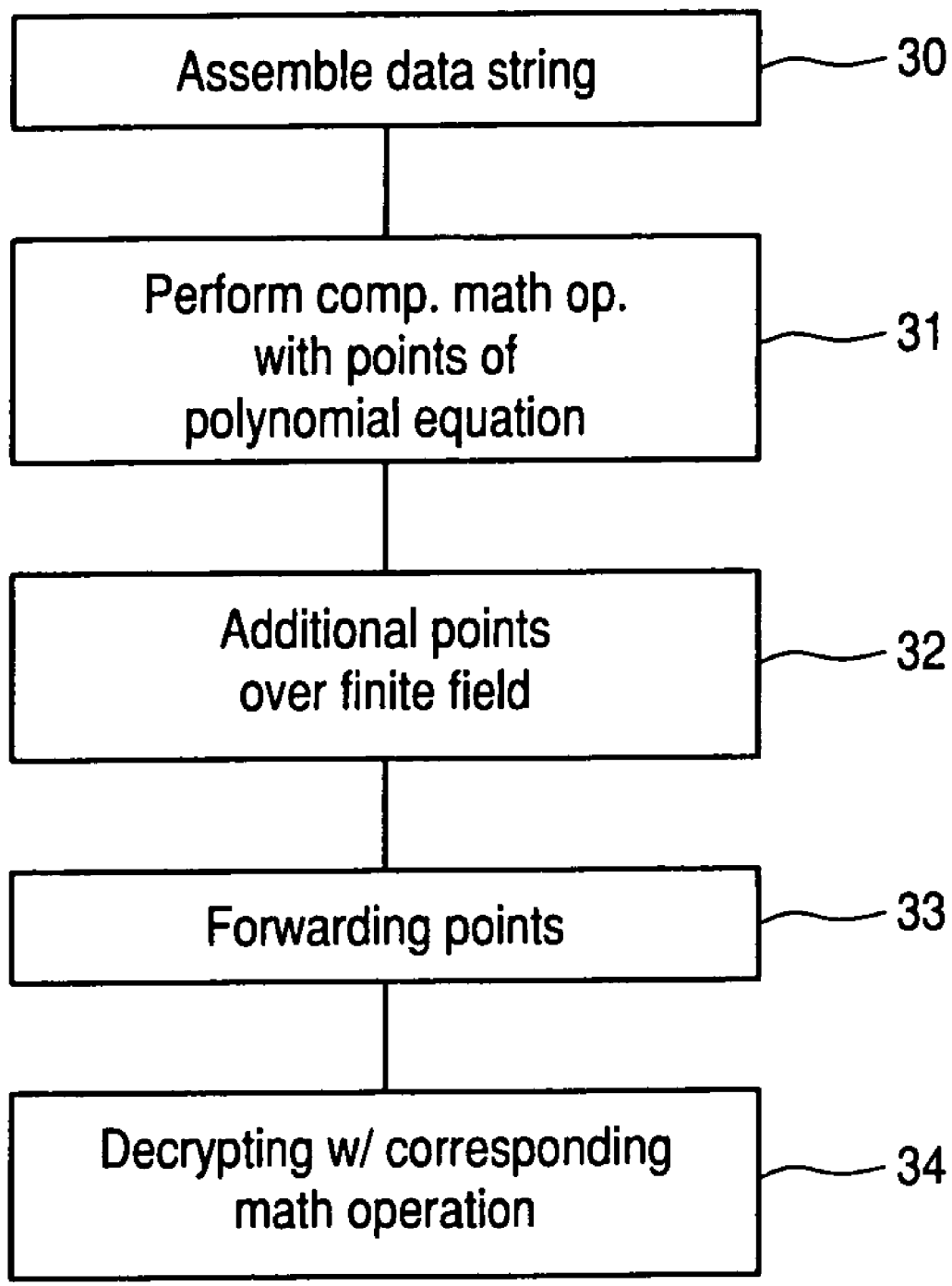
FIG. 3 is a block diagram illustrating a first embodiment of the invention.

As illustrated in FIG. 3, a process for communicating securely over an insecure communication channel implements respective ones of a pair of complimentary mathematical operations and utilizes the scaler multiplication of a shared key represented as a scaler value and a base point. The method comprises the step 30 of assembling a bit string including information to be transferred to a receiving correspondent. Step 31 involves performing a complimentary mathematical operation using points that satisfy an elliptic polynomial equation with more than one cubic variable that are termed x-coordinates wherein all the corresponding coordinates of such points are elements of a finite field and wherein the addition of any two of these elliptic points is defined over an extended dimensional space that incorporates the additional x-coordinates, and wherein this point addition is computed using arithmetic over a finite field F in step 32.

in step 33 the set of points are forwarded over an communication channel to receiving correspondents who in step 34 performs the other of the corresponding mathematical cryptographic operations to decrypt the data.

Figure 4:
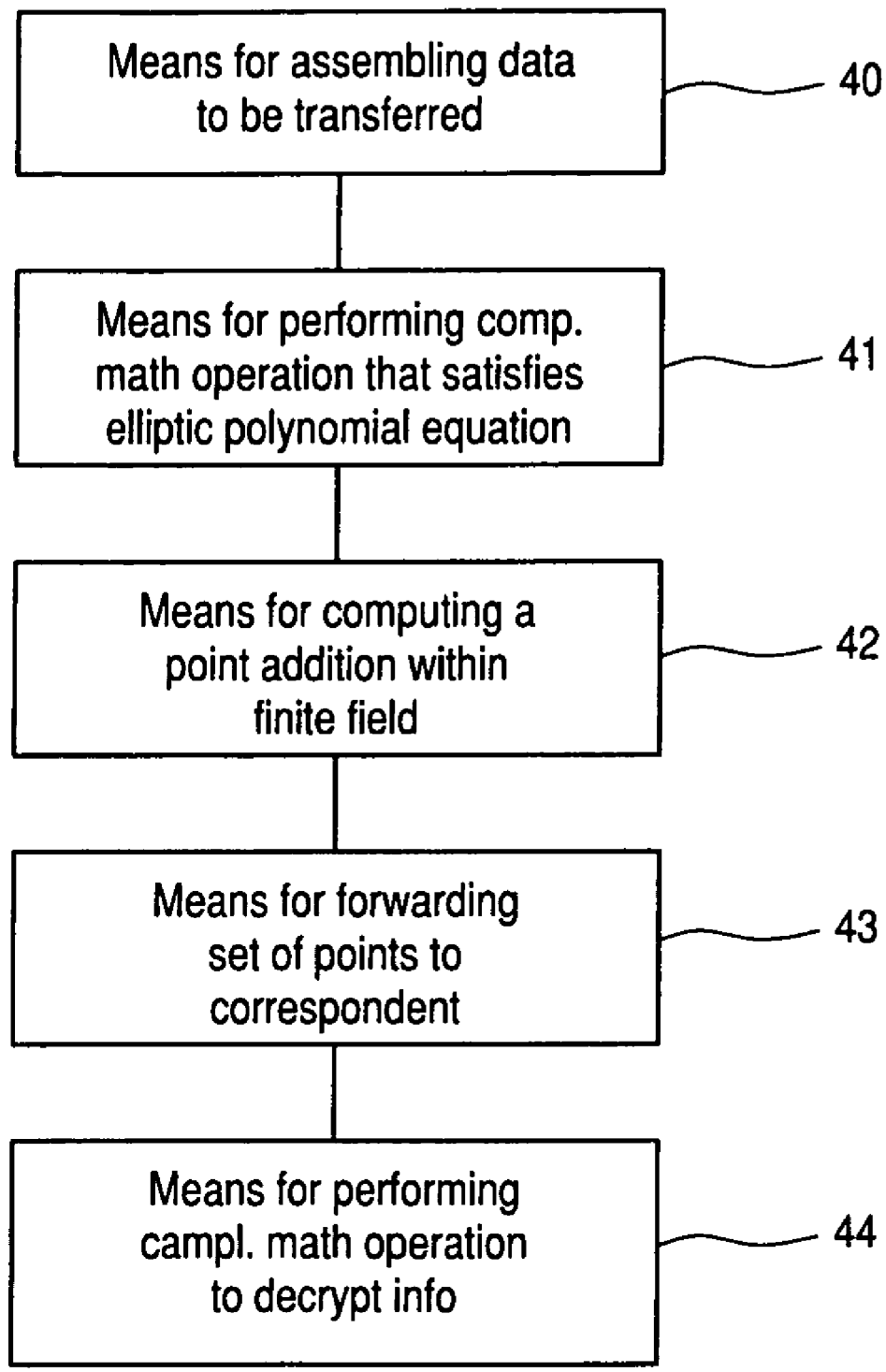
FIG. 4 is a block diagram illustrating another embodiment of the invention.

FIG. 4 illustrates a further embodiment of the invention namely a system for encrypting and decrypting a bit string used in information processing, storage, and transmission, implementing respective ones of a pair of complimentary mathematical operations using scaler multiplication of a shared key represented as a scaler value and a base point. The system includes means 40 for assembling a data string including information to be transferred from a sending correspondent to a receiving correspondent and mean 41 for performing a complimentary mathematical operation using points that satisfy an elliptic polynomial equation with more than one cubic variable termed x-coordinates, and wherein all the corresponding coordinates of such points are elements of a finite field. Means 42 are provided for the addition of any two of the elliptic points as defined over an extended dimensional space that incorporates the additional x-coordinates and wherein a point addition is computed using arithmetic over a finite field. The system also includes means 43 for forwarding the define set of points over a communication channel to a receiving correspondence and means 44 for performing the other of the corresponding mathematical cryptographic operations to decrypt the data.

The above is implemented as a pure hardware unit or as a program stored on a computer readable storage device and executed as a digital computer or a combination of both.

Figure 5:
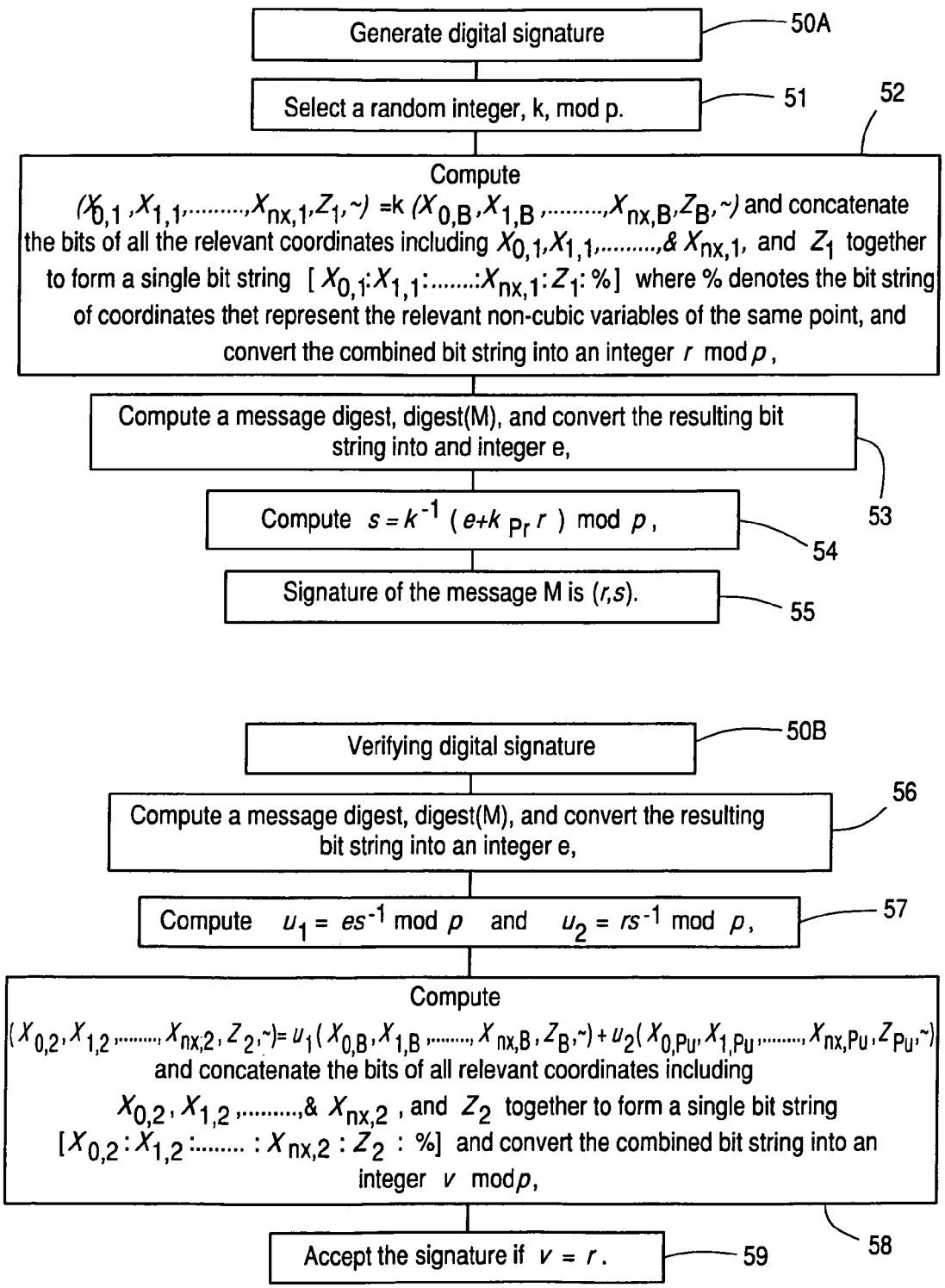
FIG. 5 is a block diagram illustrating a further embodiment of the invention.

A further embodiment of the invention is illustrated in FIG. 5 which illustrates a method for generating and verifying a digital signature. As shown in FIG. 5, the method for generating and verifying a digital signature includes a first portion for generating the digital signature 50A. Generating the signature includes the following steps: selecting a random integer, k MODp in step 51 and in step 52 computing wherein NX additional X-coordinates are used and where nx is greater than or equal to one, wherein the entity which generates a signature has a private key, $k_{Pr}$, and a public key $$(X_{0,Pu}, X_{1,Pu}, \ldots, X_{nx,Pu}, Z_{Pu}, \sim) = k_{Pr}(X_{0,B}, X_{1,B}, \ldots, X_{nx,B}, Z_B, \sim)$$

where ~ denotes coordinates that represent non-cubic variables of the same point, and where given a message M, the entity generating the signature performs the following steps, 1 select a random integer, k, mod p.
2 compute $$(X_{0,1}, X_{1,1}, \ldots, X_{nx,1}, Z_1, \sim) = k(X_{0,B}, X_{1,B}, \ldots, X_{nx,B}, Z_b, \sim)$$

and concatenate the bits of all the relevant coordinates including $X_{0,1}, X_{1,1}, \ldots, \& X_{nx,1}$, and $Z_1$ together to form a single bit string $[X_{0,1}:X_{nx,1}:Z_1:\%]$ where % denotes the bit string of coordinates that represent the relevant non-cubic variables of the same point, and convert the combined bit string into an integer r mod p. The method also includes the step 53 compute a message digest, digest(M), and convert the resulting bit string into an integer e,
4 compute $s=k^{-1}(e+k_{Pr}r)$ mod p, in step 54
5 signature of the message M is )r,s) as indicated by step 55
and wherein the receiving entity verify the signature in step 50B using the following steps,
1 compute a message digest, digest(M), and convert the resulting bit string into an integer e, in step 56
2 compute $u_1=es^{-1}$ mod p and $u_2=rs^{-1}$ mod p, in step 57
3 compute $$(X_{0,1-i}, X_{1,2}, \ldots X_{nx,2}, Z_2, \sim) = u_1(X_{0,B}, X_{1,B}, \ldots, X_{nx,B}, Z_B, \sim) + u_2(X_{0,Pu}, X_{1,Pu}, \ldots, X_{nx,Pu}, Z_{Pu}, \sim)$$

and concatenate the bits of all relevant coordinates including $x_{0,2}, X_{1,2}, \ldots, \& X_{nx,2}$, and $Z_2$ together to form a single bit string $[X_{0,2}:X_{1,2}:\ldots:X_{nx,2}:Z_2:\%]$ and convert the combined bit string into an integer v mod p, in step 58
4 accept the signature if v=r in step 59

While the invention has been described in connection with the preferred embodiments, it should be recognized that changes and modifications may be made therein without departing from the scope of the appended claims.

The invention claimed is:

1. A method for communicating securely over an insecure communication channel between a pair of correspondents who perform shared key cryptographic operations by implementing respective ones of a pair of complimentary mathematical operations utilizing the scalar multiplication of a shared key representing as a scalar value and a base point, said method comprising the steps of:

assembling a data string including information to be transferred from a sending correspondent to a receiving correspondent;

performing a complimentary mathematical operation using points that satisfy an elliptic polynomial equation with more than one cubic variable that are termed x-coordinates wherein all the corresponding coordinates of such points are elements of a finite field F, and wherein the addition of any two of these elliptic points is defined over an extended dimensional space that incorporates the additional x-coordinates, and wherein this point addition is computed using arithmetic over a finite filed F; and forwarding the defined set of points over a communication channel to the receiving correspondent and performing the other of the corresponding mathematical cryptographic operations to decrypt the data.

2. A method for communicating securely over an insecure communication channel between a pair of correspondents according to claim 1 using an elliptic polynomial equation which consists of the sum of many monomials and wherein the equation has more than two independent variables such that:

(a) the maximum total degree of any monomial in the polynomial is three, (b) at least two variables, termed the x-coordinates, have a maximum degree of three, and each must appear in one of the monomials with a degree of three, (c) at least one variable, termed the y-coordinate, has a maximum degree of two, and must appear in one of the monomials on its own with a degree of two.

3. A method of encrypting and decrypting a message bit string in an information processing system by implementing respective ones of a pair of complimentary mathematical operations using a scalar multiplication of a shared key represented as a scalar value and a base point, said method comprising the steps of:

assembling a data string including information to be transferred from a sending correspondent to a receiving correspondent;

performing a complimentary mathematical operation using points that satisfy an elliptic polynomial equation with more than one cubic variable that are termed x-coordinates wherein all the corresponding coordinates of such points are elements of a finite field F, and wherein the addition of any two of these elliptic points is defined over an extended dimensional space that incorporates the additional x-coordinates, and wherever the point addition is computed using arithmetic over finite filed F; and using an elliptic polynomial equation which consists of the sum of many monomials and wherein the equation has more than two independent variables such that:

(a) the maximum total degree of any monomial in the polynomial is three, (b) at least two variables, termed the x-coordinates, have a maximum degree of three, and each must appear in one of the monomials with a degree of three, (c) at least one variable, termed the y-coordinate, has a maximum degree of two, and must appear in one of the monomials on its own with a degree of two;

wherein the representation of the corresponding elliptic points include more than one x-coordinate, wherein all the corresponding coordinates of such points are elements of a finite field F represented in N-bit strings, and which includes a step where extra message bits are embedded in the additional x-coordinates;

forwarding the defined set of points over a communication channel to the receiving correspondent and performing the other of the corresponding mathematical cryptographic operations to decrypt the data.

4. A method of encrypting and decrypting a message bit string in an information processing system in accordance with claim 3 wherein predetermined mappings are used to indicate that an elliptic point that has more than one x-coordinate is equivalent to one or more elliptic points that satisfy the same elliptic polynomial equation with more than one x-coordinate, wherein the elliptic points that are equivalent to each other can be substituted for each other at random or according to preselected rules during point addition and/or point doubling operations, and wherein mappings that indicate that an elliptic point is equivalent to itself are also referenced.

5. A method of encrypting and decrypting a message bit string in an information processing system in accordance with claim 4, wherein nx additional x-coordinates are used and where nx is greater than or equal to one, said method comprising the steps of:

embedding a message bit string into the appropriate coordinates including the additional nx x-coordinates, $x_0$, $x_1$, ..., & $x_n$, of an elliptic point which is designated as the message point, $(x_{0,m}, x_{1,m}, \ldots, x_{nx,m}, \sim)$ where $\sim$ denotes coordinates that represent non-cubic variables of the same point;

providing shared keys, $k_{il}$ for i=1, ..., I, and l=1, ..., L where I & L are greater or equal to one, base points $(x_{0,B(i)}, x_{1,B(i)}, \ldots, x_{nx,B(i)}, \sim)$ for i=1, ..., I where I is greater or equal to one, to compute the point $(x_{0,bk}, x_{1,bk}, \ldots, x_{nx,bk}, \sim)$ using, $$(x_{0,bk}, x_{1,bk}, \ldots, x_{nx,bk}, \sim) = \sum_{i=1}^{I} (k_{iL}(k_{iL-1} \ldots (k_{i1}(x_{0,B(i)}, x_{1,B(i)}, \ldots, x_{nx,B(i)}, \sim)) \ldots ));$$

computing a cipher point $(x_{0,c}, x_{1,c}, \ldots, x_{nx,c}, \sim)$ using $(x_{0,c}, x_{1,c}, \ldots, x_{nx,c}, \sim) = (x_{0,m}, x_{1,m}, \ldots, x_{nx,m}, \sim) + (x_{0,bk}, x_{1,bk}, \ldots, x_{nx,bk}, \sim)$;

sending appropriate bits of the coordinates of the cipher point including its additional nx x-coordinates, $x_{1,c}, \ldots$ & $x_{nx,c}$, and any additional information needed to help the receiving correspondent recover the message bit string without compromising security;

using the shared keys, $k_{il}$ for i=1, ..., I and l=1, ..., L where I & L are greater or equal to one, the base points $(x_{0,B(i)}, x_{1,B(i)}, \ldots, x_{nx,B(i)}, \sim)$ for i=1, ..., I where I is greater or equal to one, and additional information received from the sending correspondent, compute the point $(x_{0,bk}, x_{1,bk}, \ldots, x_{nx,bk}, \sim)$ using, $$(x_{0,bk}, x_{1,bk}, \ldots, x_{nx,bk}, \sim) = \sum_{i=1}^{I} (k_{iL}(k_{iL-1} \ldots (k_{i1}(x_{0,B(i)}, x_{1,B(i)}, \ldots, x_{nx,B(i)}, \sim)) \ldots ));$$

computing the message point $(x_{0,m}, x_{1,m}, \ldots, x_{nx,m}, \sim)$ using $(x_{0,m}, x_{1,m}, \ldots, x_{nx,m}, \sim) = (x_{0,c}, x_{1,c}, \ldots, x_{nx,c}, \sim) - (x_{0,bk}, x_{1,bk}, \ldots, x_{nx,bk}, \sim)$ and if need be any additional information received from the sending correspondent;

recovering the message bit string from the appropriate coordinates of the message point including its additional nx x-coordinates, $x_{1,m}, \ldots$ & $x_{nx,m}$, and any additional information received from the sending correspondent.

6. A method of encrypting and decrypting a message bit string in an information processing system in accordance with claim 5 wherein each point operation used to compute the point $(x_{0,bk}, x_{1,bk}, \ldots, x_{nx,bk}, \sim)$ is defined over a designated sub-space that contains at least one x-coordinate and one y-coordinate, wherein the variables denoting other coordinates not contained in a designated sub-space are considered as constants, and wherein the designated sub-spaces of different point operations can be completely disjoint from each other, or can be shared partially or completely.

7. A method for encrypting and decrypting a message bit string in an information processing system according to claim 6 wherein embedding of the message bit string into an elliptic point with (nx+1) x-coordinates, $x_0, x_1, \ldots$ & $x_{nx}$, and (ny+1) y-coordinates, $y_0, y_1, \ldots$ & $y_{ny}$, comprising the steps of:

dividing a message bit string into M-bit strings where $((nx+ny+1)N-L) > M > (N-L)$, dividing each M-bit string into (nx+ny+1) strings $mx_0, mx_1, \ldots, mx_{nx}, my_1, \ldots,$ & $my_{ny}$, wherein the length of string $mx_0$ must be no more than (N-L) bits, while the length of each of the other "nx+ny" strings $mx_1, \ldots, mx_{nx}, my_1, \ldots,$ & $my_{ny}$ must be no more than N bits, and wherein each one of the (nx+ny+1) bit strings must have an equivalent value which is an element of the underlying finite field F, assigning the value of the bit strings of $mx_1, \ldots,$ & $mx_{nx}$ to $x_1, \ldots$ & $x_{nx}$, assigning the value of the bit strings of $my_1, \ldots,$ & $my_{ny}$ to $y_1, \ldots$ & $y_{ny}$, assigning the value of the bit string of $mx_0$ to $x_0$ substituting the values of $x_0, x_1, \ldots,$ & $x_{nx}$ and $y_1, \ldots$ & $y_{ny}$ in a selected elliptic polynomial equation with (nx+1) x-coordinates and (ny+1) y-coordinates to form a quadratic equation in $y_0$, $$y_0^2 + Ay_0 + B = 0$$

If the quadratic equation in $y_0$ has solutions for $y_0$ wherein the solutions are elements of the finite field F, assign one of the solutions to $y_0$ at random or according to a certain rule, otherwise, continue incrementing $x_0$ until a quadratic equation of $y_0$ is formed that has solutions in the finite field F; once removed solutions are obtained, assign one of the solutions to $y_0$ at random or according to a certain rule, and in the case of quadratic equations with A=0, the Legendre symbol is used as an efficient test for the existence of a solution of a quadratic equation.

8. A method of encrypting and decrypting a message bit string in an information processing system according to claim 7 in which a projective coordinate is used by the sending correspondent and the receiving correspondent to eliminate the inversion or division during each point addition and doubling operation of a scalar multiplication, and for randomizing the computation in order to provide a counter measure against differential power analysis.

9. A system for encrypting and decrypting a bit string used in information processing, storage, and transmission, implementing respective ones of a pair of complimentary mathematical operations using scalar multiplication of a shared key represented as a scalar value and a base point, said system comprising:

means for assembling a data string including information to be transferred from a sending correspondent to a receiving correspondent;

means for performing a complimentary mathematical operation using points that satisfy an elliptic polynomial equation with more than one cubic variable termed x-coordinates, wherein all the corresponding coordinates of such points are elements of a finite field, F, and wherein the addition of any two of these elliptic points is defined over an extended dimensional space that incorporates the additional x-coordinates, and wherein a point addition is computed using arithmetic over a finite field F; and means for forwarding the defined set of points over a communication channel to a receiving correspondent for performing the other of the corresponding mathematical cryptographic operations to decrypt the data, and which is implemented as a pure hardware unit or as a program stored on a computer readable storage device and executed as a digital computer or a combination of both.

10. A method for communicating securely over an insecure communication channel between a pair of correspondents who perform shared key cryptographic operations by implementing respective ones of a pair of complimentary mathematical operations utilizing the scalar multiplication of a shared key represented as a scalar value and a base point, said method comprising the steps of:

assembling a data string including information to be transferred from a sending correspondent to a receiving correspondent;

performing a complimentary mathematical operation using points that satisfy an elliptic polynomial equation in projective coordinate with more than one cubic variable that are termed X-coordinates, wherein all the corresponding coordinates of such points are elements of a finite field F, and wherein the addition of any two of these elliptic points is defined over an extended dimensional space that incorporates the additional X-coordinates, as well as a projective coordinate and wherein this point addition is computed using arithmetic over a finite field F; and forwarding the defined set of points over a communication channel to the receiving correspondent and performing the other of the corresponding mathematical cryptographic operations to decrypt the data.

11. A method for communicating securely over an insecure communication channel between a pair of correspondents according to claim 10 using an elliptic polynomial equation in projective coordinate which consists of the sum of many terms known as monomials and wherein the equation before it is projected using a projective coordinate has more than two independent variables such that:

(a) the maximum total degree of any monomial in the polynomial is three, (b) at least two variables, termed the x-coordinates, have a maximum degree of three, and each must appear in one of the monomials with a degree of three, (c) at least one variable, termed the y-coordinate, has a maximum degree of two, and must appear in one of the monomials on its own with a degree of two.

12. A method of encrypting and decrypting a message bit string in an information processing system by implementing respective ones of a pair of complimentary mathematical operations using the scalar multiplication of a shared key represented as a scalar value and a base point, said method comprising the steps of:

assembling a data string including information to be transferred from a sending correspondent to a receiving correspondent;

performing a complimentary mathematical operation using points that satisfy an elliptic polynomial equation with more than one cubic variable termed X-coordinates wherein the elliptic polynomial equation is represented in projective coordinate, wherein all the corresponding coordinates of such points are elements of a finite field, F, and wherein the addition of any two of these elliptic points is defined over an extended dimensional space that incorporates the additional X-coordinates as well as a projective coordinate and wherever the point addition is computed using arithmetic over a finite field, F; and using an elliptic polynomial equation which includes the sum of many monomials and wherein the equation before it is projected using a projective coordinate has more than two independent variables such that;

(a) the maximum total degree of any monomial in the polynomial is three, (b) at least two variables, termed the x-coordinates, have a maximum degree of three, and each must appear in one of the monomials with a degree of three, (c) at least one variable, termed the y-coordinate, has a maximum degree of two, and must appear in one of the monomials on its own with a degree of two;

wherein the representation of the corresponding elliptic points include more than one X-coordinates, and a projective coordinate wherein all the corresponding coordinates of such points are elements of a finite field F represented in N-bit strings, and which includes a step where extra message bits are embedded in the additional X-coordinates, and the projective coordinate;

forwarding the defined set of points over a communication channel to the receiving correspondent and performing the other of the correspondents mathematical cryptography operations to decrypt the data.

13. A method of encrypting and decrypting a message bit string in an information processing system in accordance with claim 12 wherein predetermined mappings are used to indicate that an elliptic point that has more than one X-coordinate and a projective coordinate is equivalent to one or more elliptic points that satisfy the same elliptic polynomial equation in projective coordinate and with more than one X-coordinate, wherein the elliptic points that are equivalent to each other can be substituted for each other at random or according to certain rules during point addition and point doubling operations, and wherein mappings that indicate that an elliptic point is equivalent to itself are also referenced in this claim.

14. A method for communicating securely over an insecure communication channel between a pair of correspondents in accordance with claim 13, wherein nx additional X-coordinates are used where nx is greater than or equal to one, said method comprising the steps of:

embedding a message bit string into the appropriate coordinates including the additional nx X-coordinates, $X_1, \ldots, \& X_n$, and a projective coordinate, Z, of an elliptic point which is designated as the message point, $(X_{o,m}, X_{1,m}, \ldots, X_{nx,m} Z_m \sim)$ where ~ denotes coordinates that represent non-cubic variables of the same point;

providing shared keys, $k_{il}$ for $i=1, \ldots, I$, and $l=1, \ldots, L$ where I & L are greater or equal to one, base points $(X_{0,B(i)}, X_{1,B(i)}, \ldots, X_{n,B(i)}, Z_{B(i)}, \sim)$ for $i=1, \ldots, I$ where I is greater or equal to one, compute the point $(X_{0,bk}, X_{1,bk}, \ldots, X_{nx,bk}, Z_{bk} \sim)$ using, $$(X_{0,bk}, X_{1,bk}, \ldots, X_{nx,bk}, Z_{bk}, \sim) = \sum_{i=1}^{I} (k_{iL}(k_{iL-1} \ldots (k_{i1}(X_{0,B(i)}, X_{1,B(i)}, \ldots, X_{nx,B(i)}, Z_{B(i)}, \sim)) \ldots ))$$

computing a cipher point $(X_{0,c}, X_{1,c}, \ldots, X_{nx,c}, Z_c, \sim)$ using $(X_{0,c}, X_{1,c}, \ldots, X_{nx,c}, Z_c, \sim) = (X_{0,m}, X_{1,m}, \ldots, X_{nx,m}, Z_m, \sim) + (X_{0,bk}, X_{1,bk}, \ldots, X_{nx,bk}, Z_{bk}, \sim)$ sending appropriate bits of the coordinates of the cipher point including its additional nx X-coordinates, $X_{o,c}, X_{1,c}, \ldots \& X_{nx,c}$, and the Z-coordinate, $Z_c$, and if need be any additional information needed to help the receiving correspondent recover the message bit string without compromising security;

using the shared keys, $k_{il}$ for $i=1, \ldots I$ and $l=1, \ldots, L$ where I & L are greater or equal to one, the base points $(X_{0,B(i)}, X_{1,B(i)}, \ldots, X_{nx,B(i)}, Z_{B(i)}, \sim)$ for $i=1, \ldots, I$ where I is greater or equal to one, and if need be any additional information received from the sending correspondent, compute the point $(X_{0,bk}, X_{1,bk}, \ldots, X_{nx,bk}, Z_{bk}, \sim)$ using, $$(X_{0,bk}, X_{1,bk}, \ldots, X_{nx,bk}, Z_{bk}, \sim) = \sum_{i=1}^{I} (k_{iL}(k_{iL-1} \ldots (k_{i1}(X_{0,B(i)}, X_{1,B(i)}, \ldots, X_{nx,B(i)}, Z_{B(i)}, \sim)) \ldots ))$$

computing the message point $(X_{0,m}, X_{1,m}, \ldots, X_{nx,m}, Z_m, \sim)$ using $(X_{0,m}, X_{1,m}, \ldots, X_{nx,m}, Z_m, \sim) = (X_{0,c}, X_{1,c}, \ldots, X_{nx,c}, Z_c \sim) - (X_{0,bk}, X_{1,bk}, \ldots, X_{nx,bk}, Z_{bk}, \sim)$ and if need be any additional information received from the sending correspondent;

recovering the message bit string from appropriate coordinates of the message point including its additional nx X-coordinates, $X_{0,m}, X_{1,m}, \ldots \& X_{nx,m}$, and the Z-coordinate, $Z_m$, and if need be any additional information received from the sending correspondent.

15. A method for communicating securely over an insecure communication channel between a pair of correspondents in accordance with claim 14 wherein each point operation used to compute the point $(X_{0,bk}, X_{1,bk}, \ldots, X_{nx,bk}, Z_{bk}, \sim)$ is defined over a designated sub-space that contains at least one X-coordinate and/or the Z-coordinate, and one Y-coordinate, wherein the variables that denote other coordinates not contained in a designated sub-space are considered as constants, and wherein the designated sub-spaces of different point operations can be completely disjointed from each other, or can be shared partially or completely.

16. A method for communicating securely over an insecure communication channel between a pair of correspondents according to claim 15 wherein embedding of the message bit string into an elliptic point with a projective coordinate, Z, $(nx+1)$ X-coordinates, $X_0, X_1, \ldots \& X_{nx}$ and $(ny+1)$ Y-coordinates, $Y_0, Y_1, \ldots \& Y_{ny}$ includes the steps of:

dividing a message bit string into M-bit strings where $((nx+ny+2)N-L) > M > (N-L)$, dividing each M-bit string into $(nx+ny+2)$ strings $mX_0, mX_1, \ldots, mX_{nx}, mY_1, \ldots, mY_{ny}$, and mZ wherein the length of string $mX_0$ must be no more than $(N-L)$ bits, while the length of the each of the other "nx+ny+1" strings $mX_1, \ldots, mX_{nx}, mY_1, \ldots, mY_{ny}$ and mZ is no more than N bits, and wherein each one of the $(nx+ny+2)$ bit strings has an equivalent value which is an element of the underlying finite field F, assigning the value of the bit strings of $mX_1, \ldots, \& mX_{nx}$ to $X_1, \ldots \& X_{nx}$, assigning the value of the bit strings of $mY_1, \ldots, \& mY_{ny}$ to $Y_1, \ldots \& Y_{ny}$, assigning the value of the bit strings of mZ to Z, assigning the value of the bit string of $mX_0$ to $X_0$, substituting the values of $X_0, X_1, \ldots, \& X_{nx}, Y_1, \ldots \& Y_{ny}$ and Z in a selected elliptic polynomial equation represented in projective coordinate, Z, with $(nx+1)$ X-coordinates, $(ny+1)$ Y-coordinates, to form a quadratic equation in $Y_0$, $$Y_0^2 + AY_0 + B = 0$$

if the quadratic equation in $Y_0$ has solutions for $Y_0$ wherein the solutions are elements of the finite field F, assign one of the solutions to $Y_0$ at random or according to a certain rule, otherwise, continue incrementing $X_0$ until a quadratic equation of $Y_0$ is formed that has solutions in the finite filed F. Once such solutions are obtained, assign one of the solutions to $Y_0$ at random or according to a certain rule, and in the case of quadratic equations with $A=0$, the Legendre symbol is used as an efficient test for the existence of a solution of a quadratic equation.

17. A method for communicating securely over an insecure communication channel between a pair of correspondents according to claim 16 in which a projective coordinate is used by the sending correspondent and the receiving correspondent to eliminate the inversion or division during each point addition and doubling operation of a scalar multiplication, and for randomizing the computation in order to provide a counter measure against differential power analysis.

18. A system for encrypting and decrypting a bit string used in information processing, storage, and transmission, implementing respective ones of a pair of complimentary mathematical operations using scalar multiplication of a shared key represented as a scalar value and a base point, said system comprising:

means for assembling a data string including information to be transferred from a sending correspondent to a receiving correspondent;

means for performing a complimentary mathematical operation using points that satisfy an elliptic polynomial equation in projective coordinate with more than one cubic variable that are termed X-coordinates, wherein all the corresponding coordinates of such points are elements of a finite field, F, and wherein the addition of any two of these elliptic points is defined over an extended dimensional space that incorporates the additional X-coordinates, and a projective coordinate and wherein a point addition is computed using arithmetic over a finite field, F; and means for forwarding the defined set of points over a communication channel to a receiving correspondent for performing the other of the corresponding mathematical cryptographic operations to decrypt the data, and which is implemented as a pure hardware unit or as a program stored on a computer readable storage device and executed as a digital computer or a combination of both.

19. A method for transferring data over a communication channel between a pair of correspondents who perform public key cryptographic operations by implementing respective ones of a pair of complimentary mathematical operations utilizing a private key of one of the correspondents represented as a scalar value and a public key of the other correspondent represented as an elliptic point, said method comprising the steps of:

assembling a data string including information to be transferred from a sending correspondent to a receiving correspondent;

performing a complimentary mathematical operation using points that satisfy an elliptic polynomial equation with more than one cubic variable that are termed x-coordinates wherein all the corresponding coordinates of such points are elements of a finite field, F, and wherein the addition of any two of these elliptic points is defined over an extended dimensional that incorporates the additional x-coordinates, and wherein this point addition is computed using arithmetic over a finite field, F; and forwarding the defined set of points over a communication channel to the receiving correspondent and performing the other of the corresponding mathematical operations of the public key and the private key cryptographic operation to decrypt the data.

20. A method for transferring data over a communication channel between a pair of correspondents according to claim 19 using an elliptic polynomial equation which consists of many monomials and wherein the equation has more than two independent variables such that:

(a) the maximum total degree of any monomial in the polynomial is three, (b) at least two variables, termed the x-coordinates, have a maximum degree of three, and each must appear in one of the monomials with a degree of three, (c) at least one variable, termed the y-coordinate, has a maximum degree of two, and must appear in one of the monomials on its own with a degree of two.

21. A method of encrypting and decrypting a message bit string in an information processing system by implementing respective ones of a pair of complimentary mathematical operations using the scalar multiplication of a private key of one of the correspondents represented as a scalar value and the public key of the other correspondent represented as an elliptic point, said method comprising the steps of:

assembling a data string including information to be transferred from a sending correspondent to a receiving correspondent;

performing a complimentary mathematical operation using points that satisfy an elliptic polynomial equation with more than one cubic variable termed x-coordinates wherein all the corresponding coordinates of such points are elements of a finite field, F, and wherein the addition of any two of these elliptic points is defined over an extended dimensional space that incorporates the additional x-coordinates, and wherever the point addition is computed using arithmetic over a finite field, F; and using an elliptic polynomial equation which includes the sum of many monomials and wherein the equation has more than two independent variables such that;

(a) the maximum total degree of any monomial in the polynomial is three, (b) at least two variables, termed the x-coordinates, have a maximum degree of three, and each must appear in one of the monomials with a degree of three, (c) at least one variable, termed the y-coordinate, has a maximum degree of two, and must appear in one of the monomials on its own with a degree of two;

wherein the representation of the corresponding elliptic points include more than one x-coordinate, wherein all the coordinates of such points are elements of F represented in N-bit strings, and which includes a step where extra message bits are embedded in the additional x-coordinates;

forwarding the defined set of points over a communication channel to the receiving correspondent and performing the other of the corresponding mathematical operations of the public key and the private key cryptographic operation to decrypt the data.

22. A method of encrypting and decrypting a message bit string in an information processing system in accordance with claim 21 wherein predetermined mappings are used to indicate that an elliptic point that has more than one x-coordinate is equivalent to one or more elliptic points that satisfy the same elliptic polynomial equation with more than one x-coordinate, wherein the elliptic points that are equivalent to each other can be substituted for each other at random or according to certain rules during point addition and point doubling operations, and wherein mappings that indicate that an elliptic point is equivalent to itself are also referenced.

23. A method of encrypting and decrypting a message bit string in an information processing system in accordance with claim 22, wherein nx additional x-coordinates are used and where nx is greater than or equal than one, said method comprising the steps of:

embedding a message bit string into the appropriate coordinates including the additional nx x-coordinates, $x_1, \ldots, \& x_{nx}$, of an elliptic point which is designated as the message point, $(x_{0,m}, x_{1,m}, \ldots, x_{nx,m}, \sim)$ where $\sim$ denotes coordinates that represent non-cubic variables of the same point;

using the private keys of the sending correspondent, $k_{SP(i,l)}$ for $i=1, \ldots, I$, and $l=1, \ldots, L_s$ where I & $L_s$ are greater or equal to one, and the public keys of the receiving correspondent $(x_{0,PuR(i)}, x_{1,PuR(i)}, \ldots, x_{nx,PuR(i)}, \sim)$ for $i=1, \ldots, I$ where I is greater or equal to one, compute the point $(x_{0,bk}, x_{1,bk}, \ldots, x_{nx,bk}, \sim)$ using, $$(x_{0,bk}, x_{1,bk}, \ldots, x_{nx,bk}, \sim) = \sum_{i=1}^{I} (k_{SP(i,L_s)}(k_{SP(i,L_s-1)}$$
$$\ldots (k_{SP(i,1)}(x_{0,PuR(i)}, x_{1,PuR(i)}, \ldots, x_{nx,PuR(i)}, \sim)) \ldots));$$

computing a cipher point $(x_{0,c}, x_{1,c}, \ldots, x_{nx,c}, \sim)$ using $(x_{0,c}, x_{1,c}, \ldots, x_{nx,c}, \sim) = (x_{0,m}, x_{1,m}, \ldots, x_{nx,m}, \sim) + (x_{0,bk}, x_{1,bk}, \ldots, x_{nx,bk}, \sim)$;

sending appropriate bits of the coordinates of the cipher point including its additional nx x-coordinates, $x_{1,c} \ldots \& x_{nx,c}$, and any additional information needed to help the receiving correspondent recover the message bit string without compromising security;

using the private keys of the receiving correspondent, $k_{RP(i,l)}$ for $i=1, \ldots, I$, and $l=1, \ldots, L_R$ where I & $L_R$ are greater or equal to one, and the public keys of the sending correspondent $(x_{0,PuS(i)}, x_{1,PuS(i)}, \ldots, x_{nx,PuS(i)}, \sim)$ for i=1, ..., I where I is greater or equal to one, and if need be any additional information received from the sending correspondent, compute the point $(x_{0,bk}, x_{1,bk}, \ldots, x_{nx,bk}, \sim)$ or its equivalent using, $$(x_{0,bke}, x_{1,bke}, \ldots, x_{nx,bke}, \sim) = \sum_{i=1}^{I} (k_{RP(i,L_R)})(k_{RP(i,L_R-1)}) \ldots (k_{RP(i,1)}(x_{0,PrS(i)}, x_{i,PuS(i)}, \ldots, x_{nx,PuS(i)}, \sim)) \ldots ))$$

and wherein $(x_{0,bke}, x_{1,bke}, \ldots, x_{nx,bke}, \sim)$ is equivalent to $(x_{0,bk}, x_{1,bk}, \ldots, x_{nx,bk}, \sim)$;

computing the message point $(x_{0,m}, x_{1,m}, \ldots, x_{nx,m}, \sim)$ using $$(x_{0,m}, x_{1,m}, \ldots, x_{nx,m}, \sim) = (x_{0,c}, x_{1,c}, \ldots, x_{nx,c}, \sim) - (x_{0,bk}, x_{1,bk}, \ldots, x_{nx,bk}, \sim)$$

and if need be any additional information received from the sending correspondent;

recovering the message bit string from the appropriate coordinates of the message point including its additional nx x-coordinates, $x_{1,m}, \ldots \& x_{ny,m}$, and if need be any additional information received from the sending correspondent.

24. A method of encrypting and decrypting a message bit string in an information processing system in accordance with claim 23 wherein the private keys of a correspondent entity $k_{P(i,l)}^{(j)}$ for i=1, ..., I, j=1, ..., J and l=1, ..., L where I, J & L are greater or equal to one, and the base points $(x_{0,B(i)}, x_{1,B(i)}, \ldots, x_{nx,B(i)}, \sim)$ for i=1, ..., I where I is greater or equal to one, are used to compute the public keys of the same correspondent entity, $(x_{0,Pu(i)}, x_{1,Pu(i)}, \ldots, x_{nx,Pu(i)}, \sim)$ for i=1, ..., I where I is greater or equal to one, $$(x_{0,Pu(i)}, x_{1,Pu(i)}, \ldots, x_{nx,Pu(i)}, \sim) = \sum_{j=1}^{J} (k_{P(i,L)}^{(j)})(k_{P(i,L-1)}^{(j)}) \ldots (k_{P(i,1)}^{(j)}(x_{0,B(i)}, x_{1,B(i)}, \ldots, x_{nx,B(i)}, \sim)) \ldots )).$$

25. A method of encrypting and decrypting a message bit string in an information processing system in accordance with claim 24 wherein each point operation used to compute the point $(x_{0,bk}, x_{1,bk}, \ldots, x_{nx,bk}, \sim)$, its equivalent, or the public key points $(x_{0,Pu(i)}, x_{1,Pu(i)}, \ldots, x_{nx,Pu(i)}, \sim)$ for i=1, ..., I where I is greater or equal to one, is defined over a designated sub-space that contains at least one x-coordinate and one y-coordinate, wherein the variables that denote other coordinates not contained in a designated sub-space are considered as constants, and wherein the designated sub-spaces of different point operation can be completely disjoined from each other, or can be shared partially or completely.

26. A method for encrypting and decrypting a message bit string in an information processing system according to claim 25 wherein embedding of the message bit string into an elliptic point with (nx+1) x-coordinates, $x_0, x_1, \ldots \& x_{nx}$, and (ny+1) y-coordinates, $y_0, y_1, \ldots \& y_{ny}$, comprising the steps of:

dividing a message bit string into M-bit strings where $((nx+ny+1)N-L) > M > (N-L)$, dividing each M-bit string into (nx+ny+1) strings $mx_0, mx_1, \ldots, mx_{nx}, my_1, \ldots, \& my_{ny}$, wherein the length of string $mx_0$ must be no more than (N-L) bits, while the length of each of the other "nx+ny" strings $mx_1, \ldots, mx_{nx}, my_1, \ldots, \& my_{ny}$ must be no more than N bits, and wherein each one of the (nx+ny+1) bit strings must have an equivalent value which is an element of the underlying finite field F, assigning the value of the bit strings of $mx_1, \ldots, \& mx_{nx}$ to $x_1, \ldots \& x_{nx}$, assigning the value of the bit strings of $my_1, \ldots, \& my_{ny}$ to $y_1, \ldots \& y_{ny}$, assigning the value of the bit string of $mx_0$ to $x_0$ substituting the values of $x_0, x_1, \ldots, \& x_{nx}$ and $y_1, \ldots \& y_{ny}$ in a selected elliptic polynomial equation with (nx+1) x-coordinates and (ny+1) y-coordinates to form a quadratic equation in $y_0$, $$y_0^2 + Ay_0 + B = 0$$

If the quadratic equation in $y_0$ has solutions for $y_0$ wherein the solutions are elements of the finite field F, assign one of the solutions to $y_0$ at random or according to a certain rule, otherwise, continue incrementing $x_0$ until a quadratic equation of $y_0$ is formed that has solutions in the finite field F; once such solutions are obtained, assign one of the solutions to $y_0$ at random or according to a certain rule, and in the case of quadratic equations with A=0, the Legendre symbol is used as an efficient test for the existence of a solution of a quadratic equation.

27. In a method for communicating securely over an insecure communication channel using elliptic polynomial cryptography according to claim 26 in which a projective coordinate is used by the sending correspondent and the receiving correspondent to eliminate the inversion or division during each point addition and doubling operation of a scalar multiplication, and for randomizing the computation in order to provide a counter measure against differential power analysis.

28. A system for encrypting and decrypting a bit string used in information processing, storage, and transmission, implementing respective ones of a pair of complimentary mathematical operations utilizing a private key of one of the correspondents and a public key of the other correspondent, said system comprising:

means for assembling a data string including information to be transferred from a sending correspondent to a receiving correspondent;

means for performing a complimentary mathematical operation using points that satisfy an elliptic polynomial equation with more than one cubic variable termed x-coordinates wherein all the corresponding coordinates of such points are elements of a finite field F, and wherein the addition of any two of these elliptic points is defined over an extended dimensional space that incorporates the additional x-coordinates, and wherein a point addition is computed using arithmetic over a finite field, F; and means for forwarding the defined set of points over a communication channel to a receiving correspondent for performing the other of the corresponding mathematical cryptographic operations to decrypt the data, and which is implemented as a pure hardware unit or as a program stored on a computer readable storage device and executed as a digital computer or a combination of both.

29. A method of encrypting and decrypting a message bit string in an information processing system by implementing respective ones of a pair of complimentary mathematical operations using the scalar multiplication of a private key of one of the correspondents represented as a scalar value and a public key of the other correspondent represented as an elliptic point, said method comprising the steps of:

assembling a data string including information to be transferred from a sending correspondent to a receiving correspondent;

performing a complimentary mathematical operation using points that satisfy an elliptic polynomial equation with more than one cubic variable termed X-coordinates wherein the elliptic polynomial equation is represented in projective coordinate, wherein all the corresponding coordinates of such points are elements of a finite field, F, and wherein the addition of any two of these elliptic points is defined over an extended dimensional space that incorporates the additional X-coordinates and a projective coordinate and wherever the point addition is computed using arithmetic over a finite field, F; and using an elliptic polynomial equation which includes the sum of many monomials and wherein the equation before it is projected using a projective coordinate has more than two independent variables such that;

(a) the maximum total degree of any monomial in the polynomial is three, (b) at least two variables, termed the x-coordinates, have a maximum degree of three, and each must appear in one of the monomials with a degree of three, (c) at least one variable, termed the y-coordinate, has a maximum degree of two, and must appear in one of the monomials on its own with a degree of two.

wherein the representation of the corresponding elliptic points include more than one X-coordinate, and a projective coordinate wherein all the corresponding coordinates of such points are elements of F represented in N-bit strings, and which includes a step where extra message bits are embedded in the additional X-coordinates and the projective coordinate;

forwarding the defined set of points over a communication channel to the receiving correspondent and performing the other of the correspondents mathematical cryptography operations to decrypt the data.

* * * * *